(12) United States Patent
Ishibiki et al.

(10) Patent No.: US 10,539,857 B2
(45) Date of Patent: Jan. 21, 2020

(54) SHUTTER APPARATUS AND IMAGING APPARATUS

(71) Applicant: CANON KABUSHIKI KAISHA, Tokyo (JP)

(72) Inventors: Jumpei Ishibiki, Kawasaki (JP); Chikara Aoshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 16/019,698

(22) Filed: Jun. 27, 2018

(65) Prior Publication Data

US 2019/0004398 A1 Jan. 3, 2019

(30) Foreign Application Priority Data

Jul. 3, 2017 (JP) .................................. 2017-130541

(51) Int. Cl.
*G03B 9/10* (2006.01)
*G03B 9/36* (2006.01)

(52) U.S. Cl.
CPC .................... *G03B 9/10* (2013.01); *G03B 9/36* (2013.01)

(58) Field of Classification Search
CPC .................................... G03B 9/10; G03B 9/26
See application file for complete search history.

(56) References Cited

FOREIGN PATENT DOCUMENTS

WO 2015/017988 A1 5/2015
WO 2015/071988 A1 5/2015

*Primary Examiner* — Clayton E. LaBalle
*Assistant Examiner* — Linda B Smith
(74) *Attorney, Agent, or Firm* — Cowan, Liebowitz & Latman, P.C.

(57) ABSTRACT

A shutter apparatus includes a shutter base having an opening, a light shield configured to reciprocate between a closed state that closes the opening and an open state that opens the opening, a motor, a cam member configured to move the light shield when the cam member is rotated by the motor, and a restricting member configured to contact the cam member and to restrict the cam member from rotating in a first direction and in a second direction different from the first direction, the restricting member being rotatable and including a rotary damper engaged with the cam member. The restricting member is located at different positions in a rotating direction between when the restricting member restricts the cam member from rotating in the first direction and when the restricting member restricts the cam member from rotating in the second direction.

12 Claims, 21 Drawing Sheets

SHUTTER APPARATUS AND IMAGING APPARATUS

BACKGROUND OF THE INVENTION

Field of the Invention

The present invention relates to a shutter apparatus that can run in different directions for an exposure operation, and an imaging apparatus having the same.

Description of the Related Art

In one conventional shutter apparatus, a stepping motor that can provide so-called step driving runs shutter blades. PCT International Publication No. 2015/071988 discloses a shutter apparatus that rotationally drives a cam member having a cam groove through a stepping motor, reciprocates shutter blades through a drive member engaged with the cam groove in the cam member, opens and closes an exposure opening.

The shutter apparatus disclosed in PCT International Publication No. 2015/071988 opens and closes the shutter after stopping moving the cam member so as to stabilize the exposure operation. However, since the cam member contacts another member and thereby stands still, the cam member needs a long time to stand still and a frame rate decreases in continuous capturing due to a rebound from the contact with the other member.

SUMMARY OF THE INVENTION

The present invention provides a shutter apparatus that enables an exposure running in reciprocating directions and stable and fast operations.

A shutter apparatus according to one aspect of the present invention includes a shutter base having an opening, a light shield configured to reciprocate between a closed state that closes the opening and an open state that opens the opening, a motor, a cam member configured to move the light shield when the cam member is rotated by the motor, and a restricting member configured to contact the cam member and to restrict the cam member from rotating in a first direction and in a second direction different from the first direction, the restricting member being rotatable and including a rotary damper engaged with the cam member. The restricting member is located at different positions in a rotating direction between when the restricting member restricts the cam member from rotating in the first direction and when the restricting member restricts the cam member from rotating in the second direction.

Further features of the present invention will become apparent from the following description of exemplary embodiments with reference to the attached drawings.

DESCRIPTION OF THE EMBODIMENTS

Referring now to the accompanying drawings, a description will be given of embodiment according to the present invention.

First Embodiment

Figure 1:
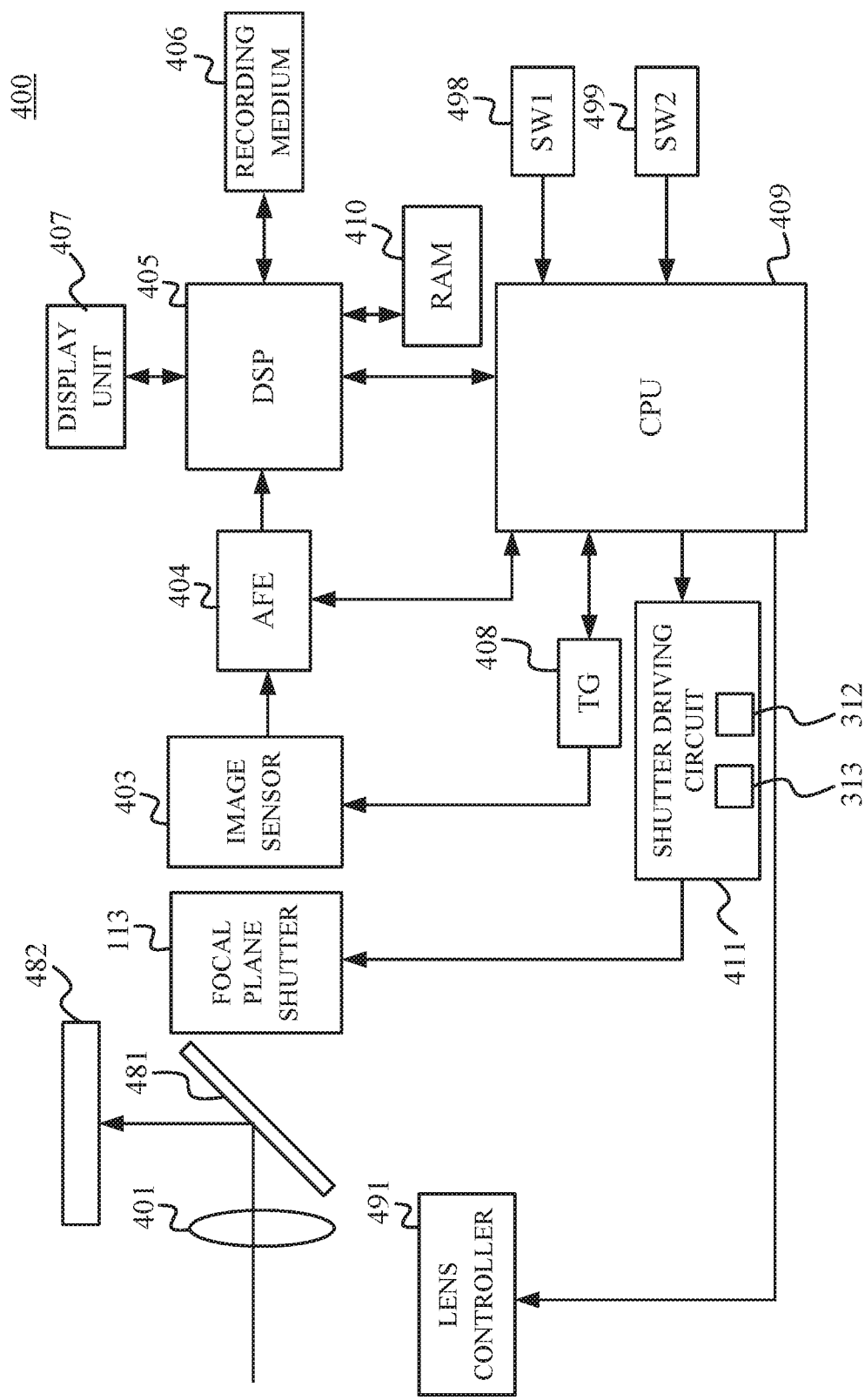
FIG. 1 is a block diagram of an imaging apparatus according to each embodiment.

Referring now to FIG. 1, a description will be given of an imaging apparatus according to a first embodiment of the present invention. FIG. 1 is a block diagram of an imaging apparatus 400. In FIG. 1, reference numeral 401 denotes an imaging lens (imaging optical system), reference numeral 113 denotes a focal plane shutter (shutter apparatus), reference numeral 403 denotes an image sensor, reference numeral 481 denotes a mirror member, and reference numeral 482 denotes a finder unit. When the imaging apparatus 400 has a finder observation state illustrated in FIG. 1, part of a light flux in object light that has passed the imaging lens 401 is reflected on the mirror member 481 in an imaging optical path, and guided to the finder unit 482. Thereby, a photographer can observe an object image via the finder unit 482. When the finder observation state transfers to an imaging state or a live-view state, the mirror member 481 retreats from the imaging optical path by an unillustrated mirror-member driving unit. Thereby, the object light from the imaging lens 401 travels to the image sensor 403.

The focal plane shutter 113 is located on the object side of the image sensor 403. Reference numeral 411 denotes a shutter driving circuit that drives the focal plane shutter 113. The focal plane shutter 113 includes a plurality of blade units (first blade unit 2 and second blade unit 3 (see FIGS. 7A and 7B)), and a CPU 409 (controller) controls driving of the focal plane shutter 113 via the shutter driving circuit 411. Each of the first blade unit 2 and the second blade unit 3 is a light shield (member) that can reciprocate between a closed state and an open state. The focal plane shutter 113 includes a motor 20 (see FIGS. 7A and 7B).

Figure 2:
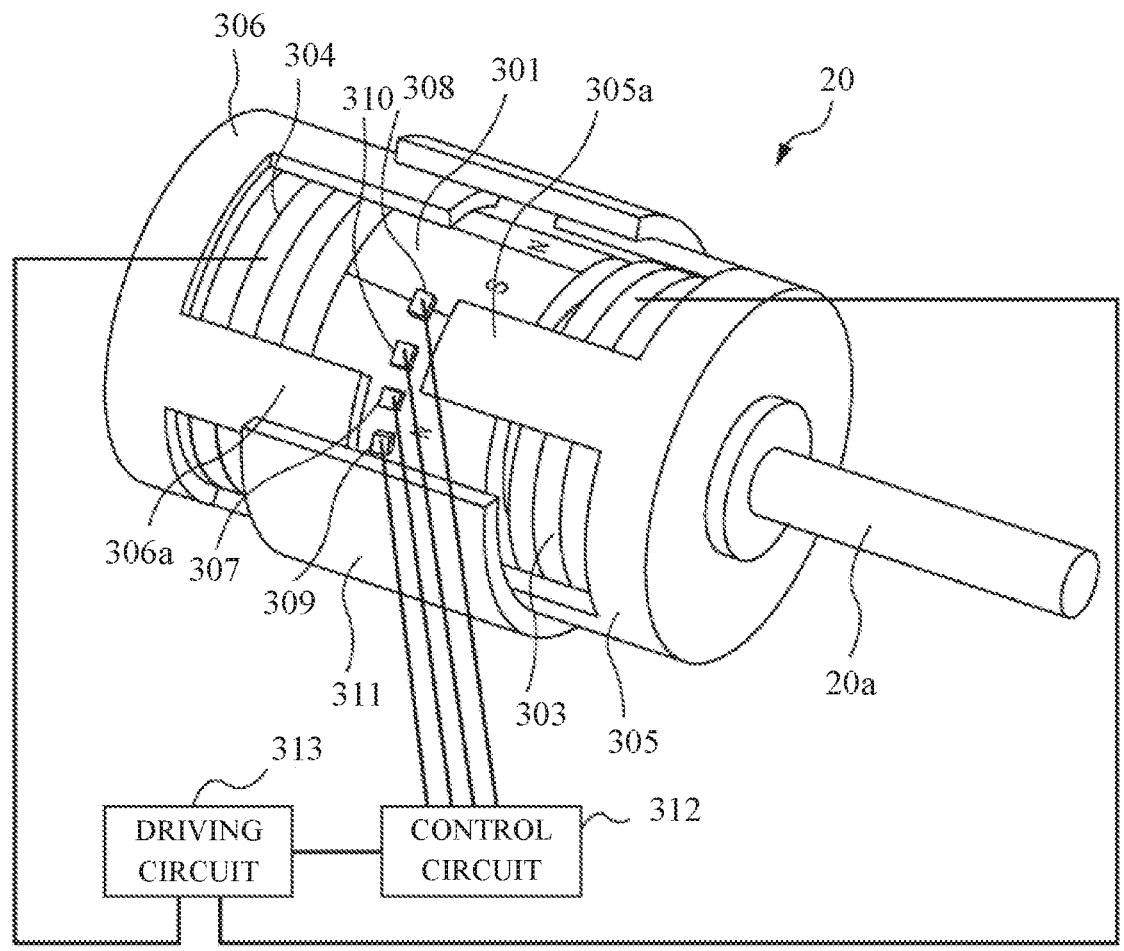
FIG. 2 schematically illustrates a motor according to each embodiment.

FIG. 2 is a schematic view of the motor 20. As illustrated in FIG. 2, a rotor (output shaft 20*a*) includes a magnet 301 and its rotational driving is controlled by a control circuit (controller) 312 and a driving circuit 313 in the shutter driving circuit 411. The magnet 301 has a cylindrical shape, and an outer circumferential surface is divided in a circumferential direction, and alternately magnetized into different poles. This embodiment divides it into eight or magnetizes it into eight poles, but is not limited to eight poles and may magnetize it into four or twelve poles.

A first coil 303 is located at one end of the magnet 301 in an axial direction. A first yoke 305 is made of a soft magnetic material, and spaced from an outer circumferential surface of the magnet 301. The first yoke 305 a plurality of magnetic pole parts 305*a* that extend from a cylindrical body in the axial direction and are arranged at predetermined intervals in the circumferential direction. The first magnetic pole part 305*a* is magnetized as the first coil 303 is electrified. A first stator unit includes the first coil 303, the first yoke 305, and the magnet 301 opposite to the plurality of first magnetic parts 305*a*. A second coil 304 is located at the other end opposite to the one end of the magnet 301 to which the first coil 303 is attached.

A second yoke 306 is made of a soft magnetic material, and spaced from an outer circumferential surface of the magnet 301. The second yoke 306 includes a plurality of magnetic pole parts 306*a* that extends from a cylindrical body in the axial direction, and arranged at predetermined intervals in the circumferential direction. The second magnetic pole part 306*a* is magnetized as the second coil 304 is electrified. A second stator unit includes the second coil 304, the second yoke 306, and the magnet 301 opposite to the plurality of second magnetic parts 306*a*. When a pole (N pole and S pole) excited in the first magnetic pole part 305*a* and the second magnetic pole part 306*a* is switched, a torque applied to the rotor (output shaft 20*a*) can be changed.

A detector includes a first magnetic sensor (first detection element) 307, a second magnetic sensor (second detection element) 308, a third magnetic sensor (third detection element) 309, and a fourth magnetic sensor (fourth detection element) 310. Each magnetic sensor is a Hall element used to detect a magnetic flux of each magnet 301 and fixed onto a motor cover 311. A motor cover 311 fixes and holds the first yoke 305 and the second yoke 306 so as to arrange the first magnetic parts 305*a* and the second magnetic parts 306*a* with electric angles of about 90° relative to a magnetization phase of the magnet 301.

The electric angle θ, as used herein, represents a magnetic force of the magnet for one period by 360° and is expressed as follows:

$$\theta = \theta 0 \times M/2 \quad (1)$$

This embodiment magnetizes the magnet 301 into eight poles, and the electric angle of 90° corresponds to a mechanical angle of 22.5°.

The control circuit 312 switches and drives the step driving and two types of feedback driving having different propulsions. When the control circuit 312 performs the step driving, the control circuit 312 controls the driving circuit 313 so as to switch the electrification states of the first coil 303 and the second coil 304 at predetermined time intervals. In other words, the step driving does uses none of the outputs from the first magnetic sensor 307, the second magnetic sensor 308, the third magnetic sensor 309, and the fourth magnetic sensor 310. On the other hand, when the control circuit 312 performs the two types of feedback driving, the control circuit 312 uses the outputs from the first magnetic sensor 307, the second magnetic sensor 308, the third magnetic sensor 309, and the fourth magnetic sensor 310.

The motor 20 can rotate in a third direction (first rotating direction), and a fourth direction (second rotating direction opposite to the first rotating direction), and rotates the cam gears 14 and 15 in accordance with the direction. Each of the cam gears 14 and 15 is a rotatable cam member driven by the motor 20. The operation of the motor 20 is controlled by the control circuit 312 and the drive circuit 313 (see FIG. 2) in the shutter driving circuit 411.

Reference numeral 498 denotes a switch (SW1) that starts an imaging preparation, and reference numeral 499 denotes a switch (SW2) that starts imaging. The switch (SW1) 498 and the switch (SW2) 499 constitute a two-stage switch. The first stroke turns on the switch (SW1) 498, and the second stroke turns on the switch (SW2) 499.

The image sensor 403 includes a CMOS image sensor etc., and photoelectrically converts an object image (optical image) formed via the imaging lens 401 (imaging optical system) into image data (analog image signal). An AFE (analog front end) 404 converts the analog image signal output from the image sensor 403 into a digital image signal. A DSP (digital signal processor) 405 outputs processed image data by performing various image processing and compression/decompression processing for the digital image signal output from the AFE 404.

A recording medium 406 records image data processed by the DSP 405. A display unit 407 includes a liquid crystal display (LCD) etc. and displays a captured image, a variety of menu screens, etc. A TG 408 stands for a timing generator, and controls driving of the image sensor 403. A RAM 410 is connected to the DSP 405, and temporarily stores the image data, etc.

A lens controller 491 outputs to the CPU 409 lens information of the imaging lens 401, such as a focal length, a stop diameter, an exit pupil diameter, and a distance between the exit pupil and the image sensor 403. The lens controller 491 drives the stop and the lens etc. in the imaging lens 401 under control of the CPU 409 (controller). A detection result of each detector in the lens controller 491 is input to the CPU 409. The CPU 409 controls the AFE 404, the DSP 405, the TG 408, the shutter driving circuit 411, and the lens controller 491.

Figure 3:
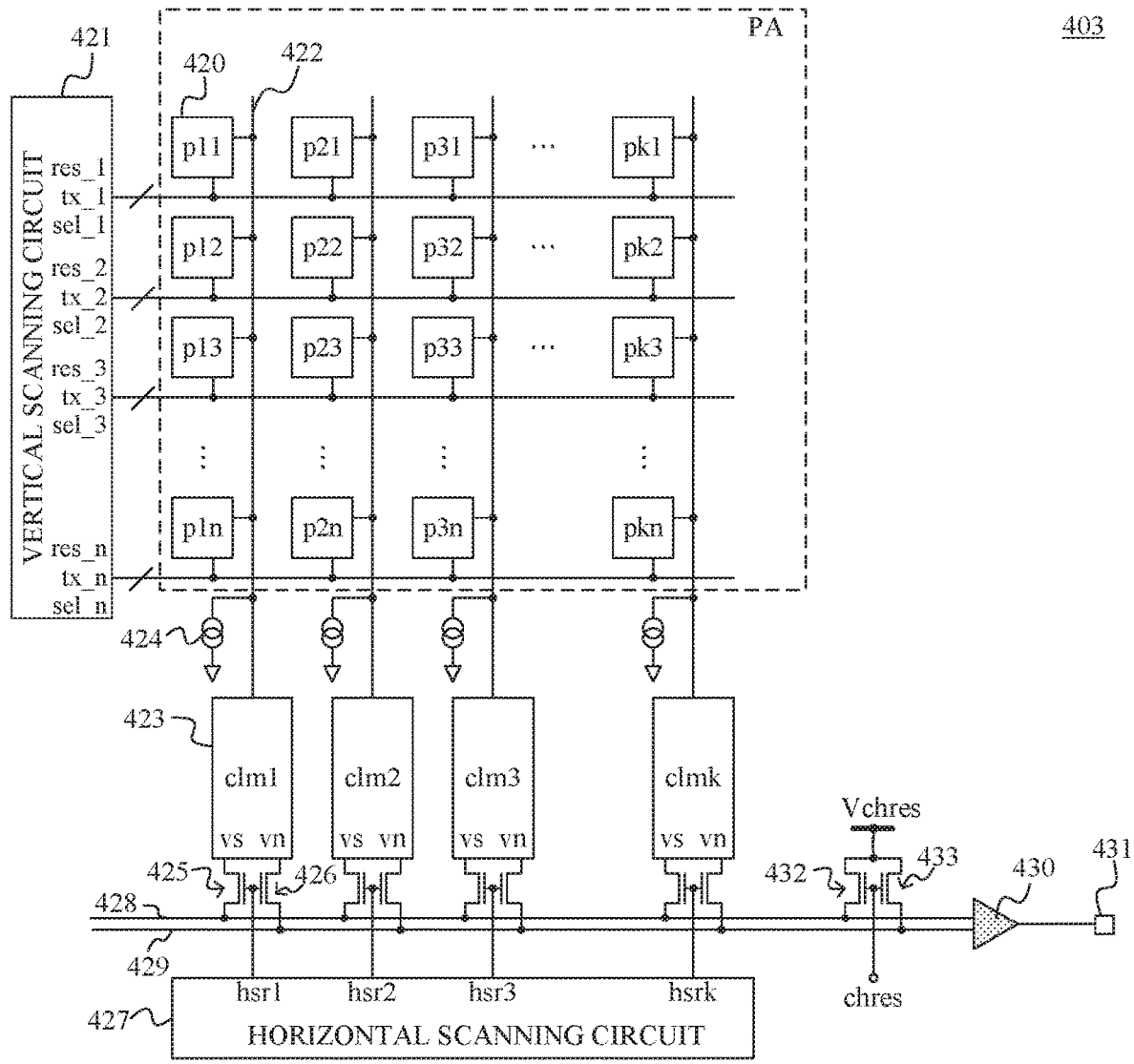
FIG. 3 illustrates an overall structure of an image sensor according to each embodiment.
Figure 4:
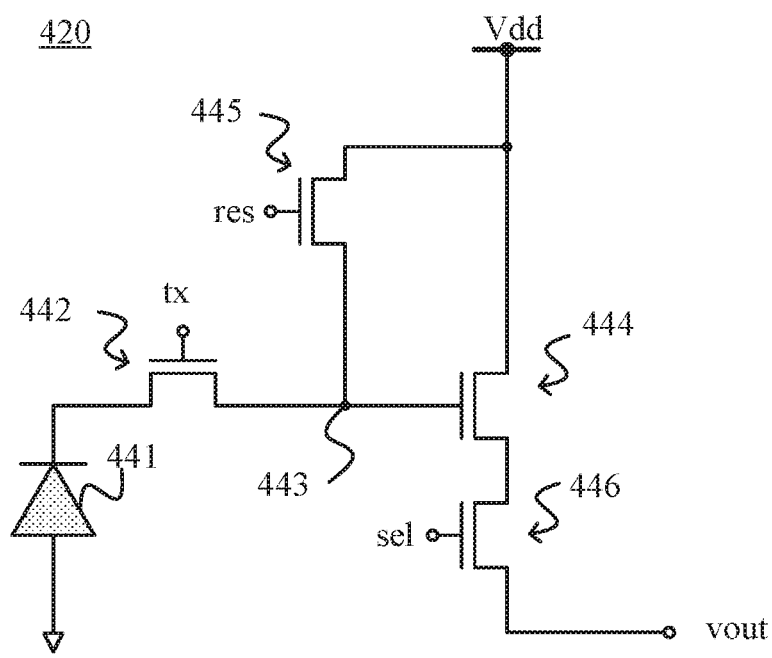
FIG. 4 is a circuit diagram in one pixel part in the image sensor according to each embodiment.

Referring now to FIGS. 3 and 4, a description will be given of an imaging operation by the image sensor 403. FIG.

3 illustrates an overall structure of the image sensor 403. FIG. 4 is a circuit diagram of one pixel part 420 in the image sensor 403.

As illustrated in FIG. 3, a plurality of pixel parts 420 (pixel parts p11 to Pkn) are arranged in a matrix in a pixel area PA in the image sensor 403. In FIG. 4, a photodiode (PD) 441 photoelectrically converts an incident light signal, and accumulates electric charges in accordance with the exposure amount. The electric charges stored in the PD 441 are transferred to a FD (floating diffusion) part 443 by turning a signal tx in a transfer gate 442 into a high level. The FD part 443 is connected to the gate in a floating diffusion amplifier (FD amplifier) 444. The FD amplifier 444 converts the charge amount transferred from the PD 441 into a voltage amount.

When a signal res of the FD reset switch 445 is turned into a high level, the electric charges in the FD part 443 are reset. In resetting the electric charges in the PD 441, the signal tx and the signal res are simultaneously turned into a high level. Thereby, both the transfer gate 442 and the FD reset switch 445 are turned on, and the PD 441 is reset via the FD part 443. A pixel signal converted into a voltage by the FD amplifier 444 is output to an output part vout in the pixel part 420 by turning a signal sel of a pixel selecting switch 446 into a high level.

In FIG. 3, the vertical scanning circuit 421 supplies driving signals res_1, tx_1, sel_1, and the like to each pixel. These driving signals are connected to the res, tx, and sel in each pixel. The output part vout in each pixel is connected to a common column read circuit 423 (clm1 to clmk) via a vertical output line 422 for each column.

Figure 5:
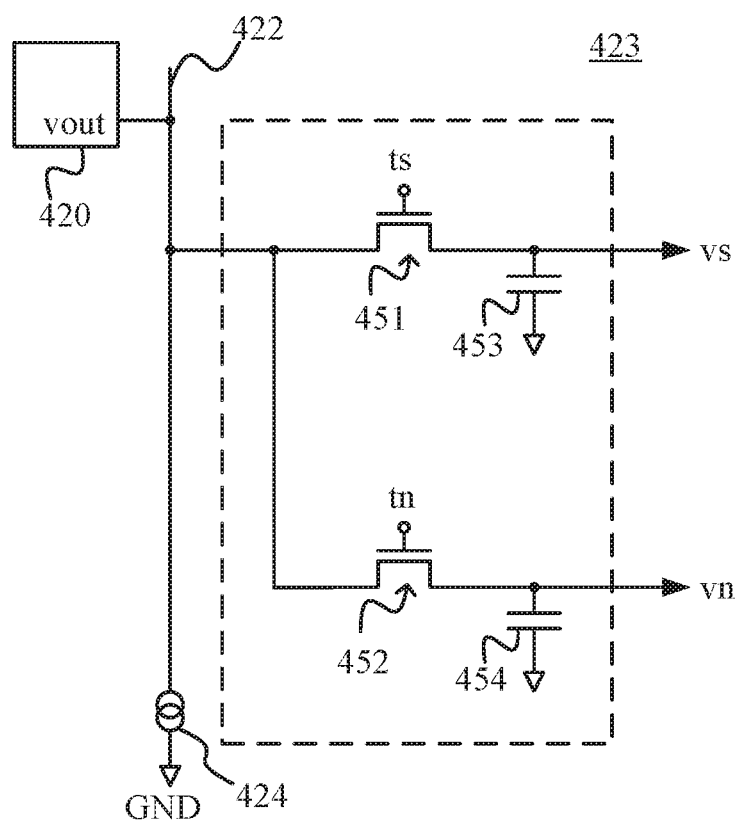
FIG. 5 is a circuit diagram in a common column read circuit in the image sensor according to each embodiment.

Referring now to FIG. 5, a description will be given of the common column read circuit 423. FIG. 5 is a circuit diagram of the column common read circuit 423 in the image sensor 403. The vertical output line 422 is provided for each column, and the output part vout in the pixel part 420 for one column is connected to each vertical output line 422. A current source 424 is connected to the vertical output line 422, and a source follower circuit includes the current source 424, and the FD amplifier 444 in each pixel in the pixel part 420.

A pixel signal S read out of the pixel part 420 is stored in an S signal retentive capacitor 453 via an S signal transfer switch 451 by turning the signal ts into a high level. A noise signal N read out of the pixel part 420 is stored in an N signal retentive capacitor 454 via a N signal transfer switch 452 by turning the signal tn into a high level. Each of the S signal retentive capacitor 453 and the N signal retentive capacitor 454 are connected to output parts vs and vn in the common column read circuit 423.

In FIG. 3, the output parts vs and vn in the common column read circuit 423 are connected to horizontal transfer switches 425 and 426. The horizontal transfer switches 425 and 426 are connected by an output signal hsr* (* is one of column numbers 1 to k) in the horizontal scanning circuit 427. When the signal hsr* turns into a high level, the signals of the S signal retentive capacitor 453 and the N signal retentive capacitor 454 are transferred to horizontal output lines 428 and 429. The horizontal output lines 428 and 429 are connected to input parts in a differential amplifier 430. The differential amplifier 430 calculates a difference between the S signal and the N signal, applies a predetermined gain to the difference, and outputs a final image signal to an output terminal 431. Horizontal output line reset switches 432 and 433 turn on when a signal Vchres becomes high, and each of the horizontal output lines 428 and 429 is reset to reset voltage Vchres.

Figure 6:
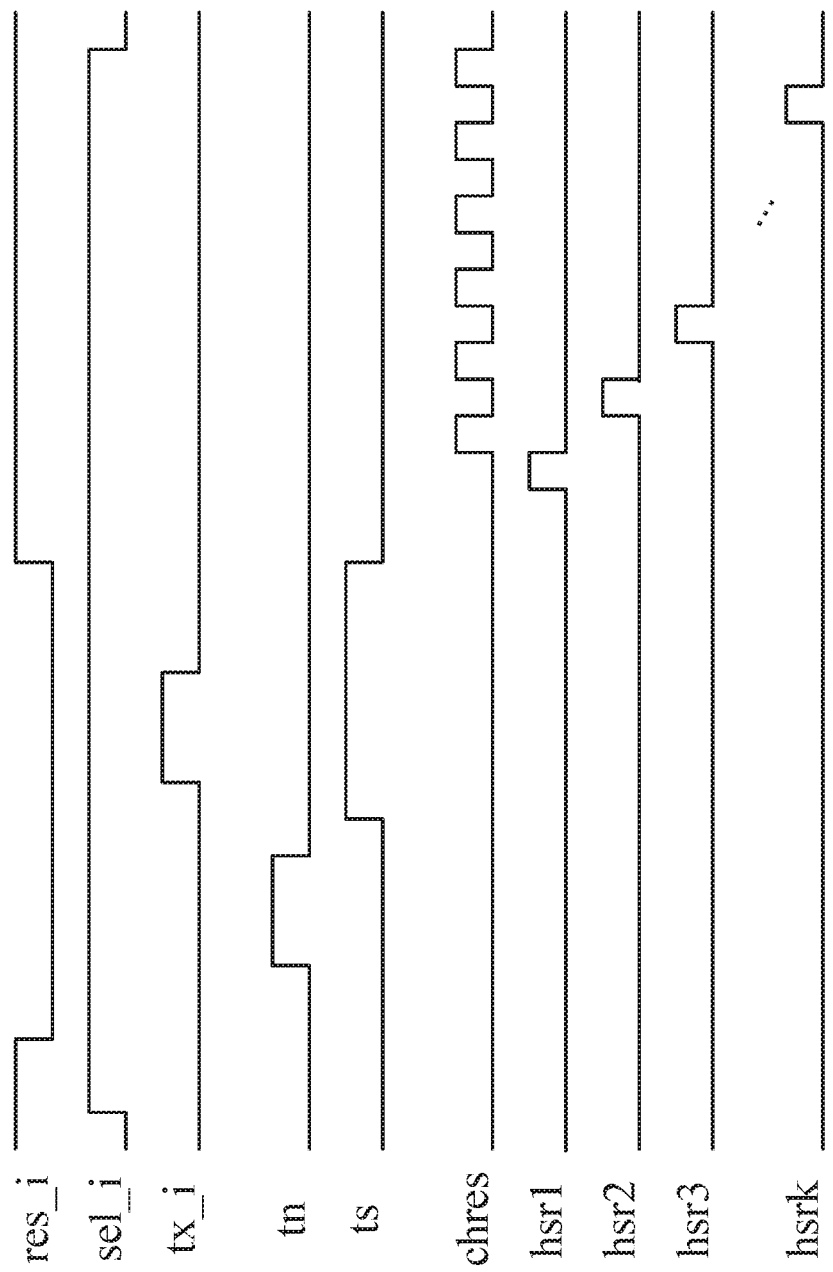
FIG. 6 is a timing chart of reset scanning and still image read scanning in the image sensor according to each embodiment.

Referring now to FIG. 6, a description will be given of still image read scanning of the image sensor 403. FIG. 6 is a timing chart of an operation per one row in the reset scanning and the still image read scanning in the image sensor 403. Now assume that an i-th row data is read out.

Initially, a signal sel_i is turned into a high level, and the pixel selecting switch 446 is turned on for the i-th pixel. Thereafter, a signal res_i is turned into a low level, the FD reset switch 445 is turned off, and the FD part 443 is released from the reset state. Next, the signal tn is turned into a high level, and the N signal is stored in the N signal retentive capacitor 454 via the N signal transfer switch 452. Next, the signal tn is turned into a low level, the N signal transfer switch 452 is turned off, and then the signal ts is turned into a high level. The S signal transfer switch 451 is turned on, a signal tx_i is turned into a high level, and the transfer switch 442 is turned on. Due to this operation, the signal stored in the selected i-th PD 441 is output to the vertical output line 422 via the FD amplifier 444 and the pixel selecting switch 446 and stored in the S signal retentive capacitor 453 via the S signal transfer switch 451.

Next, the signals tx_i and ts are turned into a low level, and the transfer gate 442 and the S signal transfer switch 451 are closed. Then, the signal res_i is turned into a high level, the FD reset switch 445 is turned on, and the FD part 443 is reset. This configuration ends operations for storing the N signal and the S signal in the S signal retentive capacitor 453 and the N signal retentive capacitor 454.

Next, the S signal stored in the S signal retentive capacitor 453 and the N signal stored in the N signal retentive capacitor 454 are output from the image sensor 403. Initially, an output hsr1 from the horizontal scanning circuit 427 turns into a high level, the horizontal transfer switches 425 and 426 are turned on, the S signal retentive capacitor 453 and the N signal retentive capacitor 454 output the signals to the output terminal 431 via the horizontal output lines 428 and 429 and the differential amplifier 430.

The horizontal scanning circuit 427 sequentially turns the selection signals hsr1, hsr2, . . . , hsrk in each column into a high level, and outputs all i-th data. While the signals hsr1 to hsrk are used to read the signal for each column, the signal chres is turned into a high level, the horizontal output lines reset switches 432 and 433 are turned on, and the horizontal output lines 428 and 429 are once reset to the reset voltages Vchres. Thus, the read operation for one row ends. This operation is repeated for each row, and reads the signals out of the image sensor 403 for all rows.

Figure 7A:
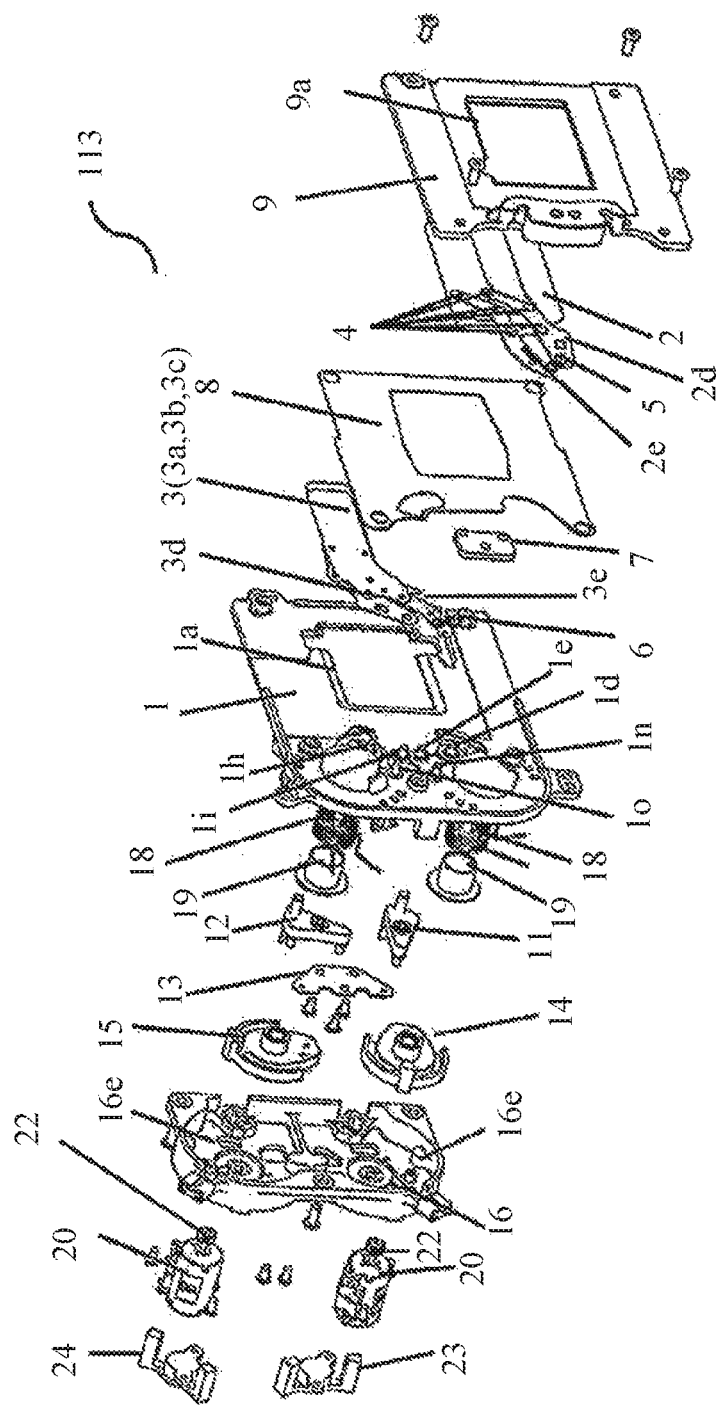
FIGS. 7A and 7B are exploded perspective views of a focal plane shutter according to each embodiment.
Figure 7B:
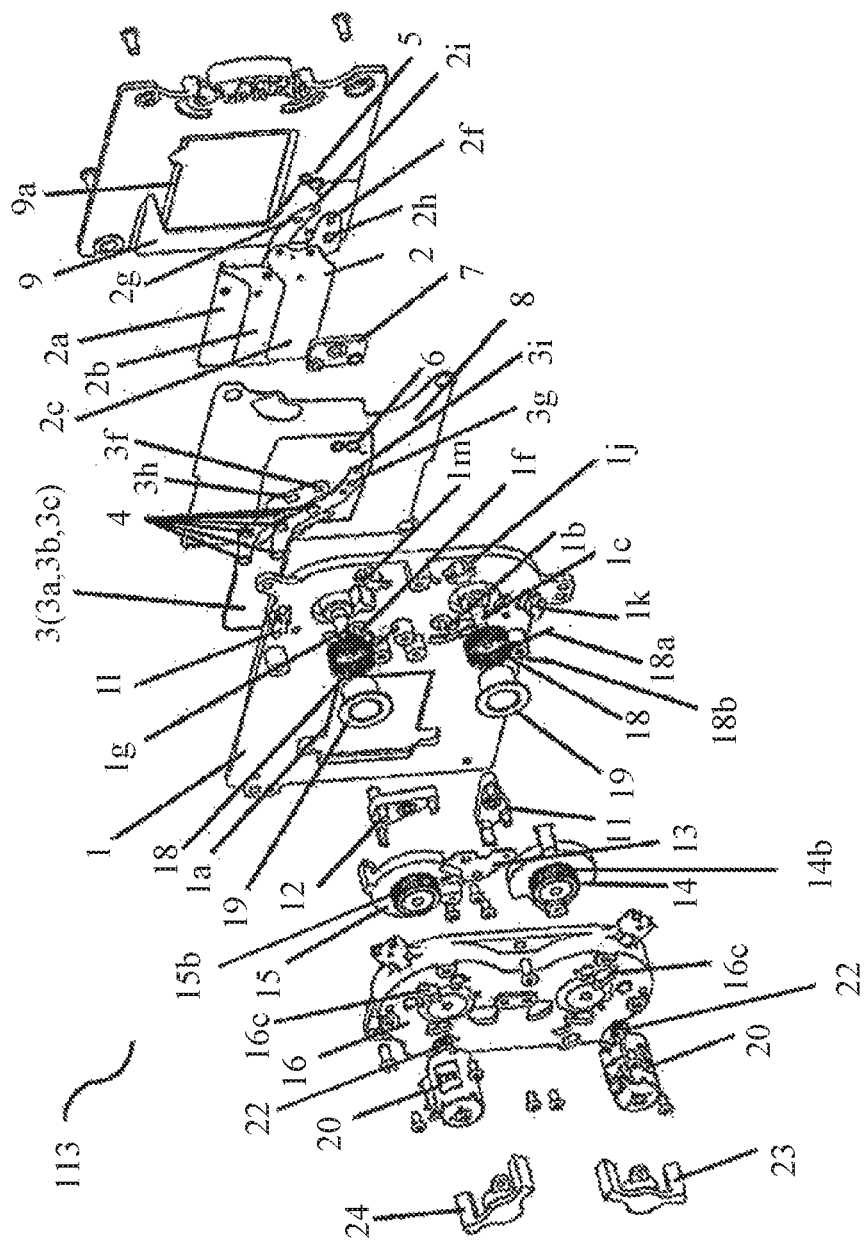

Referring now to FIGS. 7A, 7B, 11A, and 11B, a description will be given of the structure of the focal plane shutter 113 according to this embodiment. FIG. 7A is an exploded perspective view of the focal plane shutter 113 according to this embodiment viewed from the image sensor 403 side. FIG. 7B is its exploded perspective view viewed from the object side.

A cover plate 9 is attached to the shutter base 1 on the image sensor 403 side. The first blade unit 2 and the second blade unit 3 are provided between the shutter base 1 and the cover plate 9. The first blade unit 2 includes blades 2a, 2b, and 2c, and blade arms 2d and 2e. The second blade unit 3 includes blades 3a, 3b, and 3c, and blade arms 3d and 3e. The shutter base 1 and the cover plate 9 have apertures 1a and 9a (openings), respectively. Shafts 1b, 1c, 1f, and 1g are formed on the shutter base 1 on the object side. A first drive member 11 is rotatably attached to the shaft 1b, a second drive member 12 is rotatably attached to the shaft 1f, a first cam gear 14 is rotatably attached to the shaft 1c, and a second cam gear 15 is rotatably attached to the shaft 1g. The shutter base 1 has shafts 1d, 1e, 1h, and 1i on the image sensor 403 side, the first blade unit 2 is rotatably attached to the shafts 1d and 1e, and the second blade unit 3 is rotatably attached to the shafts 1h and 1i.

Figure 8:
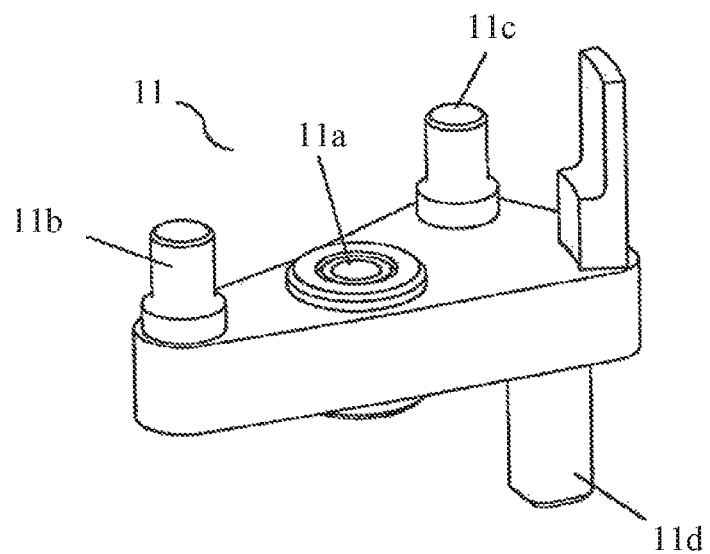
FIG. 8 is a perspective view of a first drive member in the focal plane shutter according to each embodiment.
Figure 9:
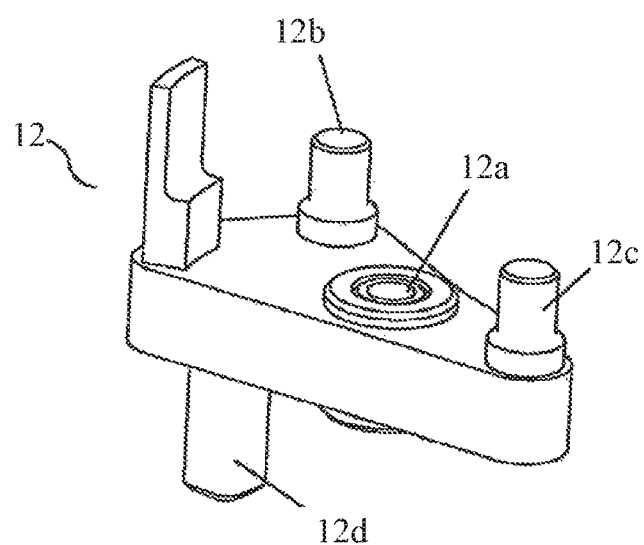
FIG. 9 is a perspective view of a second drive member in the focal plane shutter according to each embodiment.

FIG. 8 is a perspective view of the first drive member 11. FIG. 9 is a perspective view of the second drive member 12. The first drive member 11 is rotatable because a hole 1a is engaged with the shaft 1b on the shutter base 1. A first cam engagement pin 11b and a second cam engagement pin 11c in the first drive member 11 contact a plurality of cam surfaces on the first cam gear 14, which will be described later, and the first drive member 11 is driven as the first cam gear 14 rotates. The second drive member 12 is rotatable because a hole 12a is engaged with the shaft 1f on the shutter base 1. The first engagement pin 12b and the second cam engagement pin 12c in the second drive member 12 contact a plurality of cam surfaces on the second cam gear 15, which will be described later, and the second drive member 12 is driven as the second cam gear 12 rotates.

The first blade unit 2 includes two blade arms 2d and 2e, and three blades 2a, 2b, and 2c. Holes 2f and 2g in the two blade arms 2d and 2e are rotatably engaged with the shafts 1d and 1e on the shutter base 1 on the image sensor 403 side. The three blades 2a, 2b, and 2c are sequentially supported via connecting shafts 4 to the other ends of the blade arms 2d and 2e. The blade arm 2d has a hole 2h, and the hole 2h is engaged with a drive pin 11d on the first drive member 11. Due to this configuration, as the first drive member 11 rotates, the first blade unit 2 can reciprocate or transfer between a closed state in which the blades 2a, 2b, and 2c cover the aperture 1a in the shutter base 1 and an open state in which the blades 2a, 2b, and 2c retreat from the aperture 1a.

The second blade unit 3 includes two blade arms 3d and 3e, and three blades 3a, 3b, and 3c. Holes 3f and 3g in the two blades 3d and 3e are rotatably engaged with the shafts 1h and 1i on the shutter base 1 on the image sensor 403 side. The three blades 3a, 3b, and 3c are sequentially supported via the connecting shafts 4 to the other ends of the blade arms 3d and 3e. The blade arm 3d has a hole 3h, and the hole 3h is engaged with a drive pin 12d on the second drive member 12. Due to this configuration, as the second drive member 12 rotates, the second blade unit 3 can reciprocate or transfer between a closed state in which the blades 3a, 3b, and 3c cover the aperture 1a in the shutter base 1 and an open state in which the blades 3a, 3b, and 3c retreat from the aperture 1a.

A first toggle spring 5 is engaged with a shaft 1n on the shutter base 1 and a hole 2i in the blade arm 2e. Thereby, the blade arm 2e is forced in an (open state maintaining) direction in which the blades open the aperture 1a in the open state of the aperture 1a. The blade arm 2e is forced in a (closed state maintaining) direction in which the blades close the aperture 1a in the closed state of the aperture 1a. Due to this force, in the open state of the aperture 1a, the blades 2a, 2b, and 2c and the drive pin 11d on the first drive member 11 via the connecting shaft 4 contact on the contact sides when they are driven so that the blades of the hole 2h in the blade arm 2d close the aperture 1a. In the closed state of the aperture 1a, the blades 2a, 2b, and 2c and the drive pin 11d on the first drive member 11 via the connecting shaft 4 contact on the contact sides when they are driven so that the blades of the hole 2h in the blade arm 2d open the aperture 1a. The toggle spring restricting member 7 restricts the toggle spring 5 from moving in a shaft 1n direction.

A second toggle spring 6 is engaged with a shaft 1o on the shutter base 1 and a hole 3i in the blade arm 3e. Thereby, the blade arm 3e is forced in an (open state maintaining) direction in which the blades open the aperture 1a in the open state of the aperture 1a. The blade arm 3e is forced in a (closed state maintaining) direction in which the blades close the aperture 1a in the closed state of the aperture 1a. Due to this force, in the open state of the aperture 1a, the blades 3a, 3b, and 3c and the drive pin 12d on the second drive member 12 via the connecting shaft 4 contact on the contact sides when they are driven so that the blades of the hole 3h in the blade arm 3d close the aperture 1a. In the closed state of the aperture 1a, the blades 3a, 3b, and 3c and the drive pin 12d on the second drive member 12 via the connecting shaft 4 contact on the contact sides when they are driven so that the blades of the hole 3h in the blade arm 3d open the aperture 1a. The toggle spring restricting member 7 restricts the toggle spring 6 from moving in a shaft 1o direction.

A spring guide member 19 is engaged around the shafts 1c and 1g on the shutter base 1. An inner diameter part of the drive member 18 is guided by an outer circumference of the spring guide member 19, the arm 18a is engaged with engagement parts 1j and 1l of the shutter base 1, and the arm 18b is engaged with engagement parts 1k and 1m of the shutter base 1. Due to the cam gears 14 and 15, which will be described later, viewed from the object side, the arm 18a is charged so as to generate a force in a right rotating direction and the arm 18b is charged so as to generate a force in a left rotating direction. Reference numerals 23 and 24 are rotary dampers (restricting members) for restricting rotations of the cam gears 14 and 15. The rotary dampers 23 and 24 are rotatable restricting members that contact the cam gears 14 and 15 and restrict the rotations of the cam gears 14 and 15 in a first direction and a second direction different from the first direction. The rotary dampers 23 and 24 have different positions in the rotating direction between when they restrict the rotations of the cam gears 14 and 15 in the first direction and when they restrict the rotations of the cam gears 14 and 15 in the second direction.

Figure 10A:
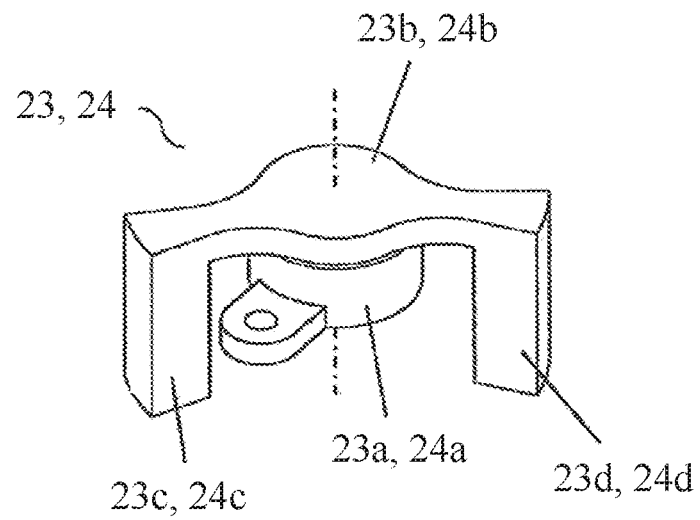
FIGS. 10A to 10C are perspective, top, and sectional views of a rotary damper in the focal plane shutter according to each embodiment.
Figure 10B:
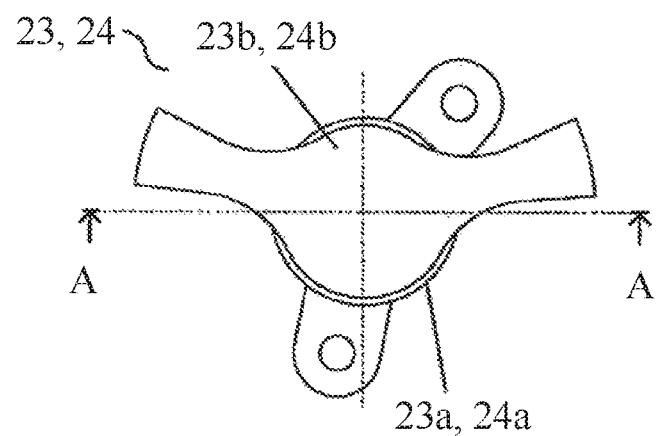
Figure 10C:
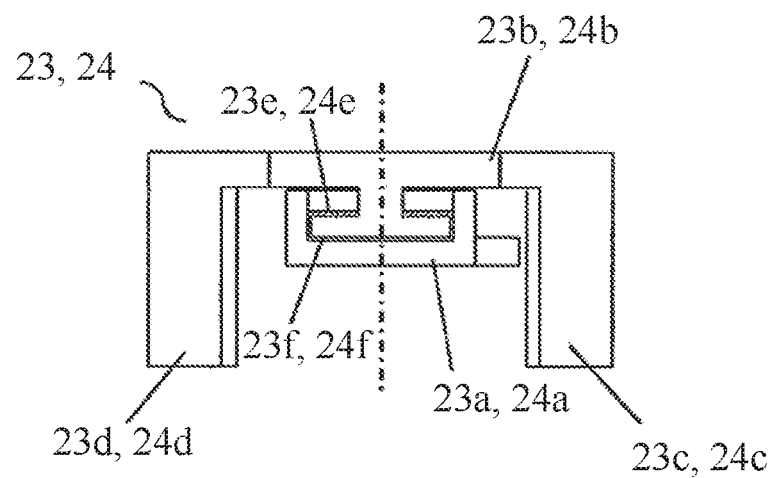

Referring now to FIG. 10A to 10C, a description of structures of the rotary dampers 23 and 24. FIGS. 10A to 10C are structural views of the rotary dampers. FIG. 10A is a perspective view, FIG. 10B is a top view, and FIG. 10C is a sectional view taken along a line A-A in FIG. 10B.

The rotary dampers 23 and 24 include base parts 23a and 24a and rotators 23b and 24b. The base parts 23a and 24a are fixed parts fixed onto a holder member 16. Insides 23f and 24f in the base parts 23a and 24a are filled with viscous liquid and sealed by seal members 23e and 24e. Due to this configuration, the rotary dampers 23 and 24 generate resistance forces in a direction opposite to the rotating direction due to the viscosity resistance in accordance with the rotating speeds of the rotators 23b and 24b and serve as dampers. The rotators 23b and 24b include arms 23c and 24c (second arm part, second contact part) and arms 23d and 24d (first arm part, first contact part). As described above, the rotators 23b and 24b are rotated as a result of that the arms 23c, 24c, 23d, and 24d contact the movable ends 14e and 15e in the cam gears 14 and 15, and the rotating positions are restricted by a contact surface 16e on the holder member 16.

Thus, in this embodiment, the rotary dampers 23 and 24 include arms 23d and 24d (first contact parts) that contact the cam gears 14 and 15 so as to restrict the cam gears 14 and 15 from rotating in the first direction. The rotary dampers 23 and 24 include arms 23c and 24c (second contact parts) that contact the cam gears 14 and 15 so as to restrict the cam gears 14 and 15 from rotating in the second direction. The first contact parts are provided at positions different from those of the second contact part in the rotary dampers 23 and 24. The rotary dampers 23 and 24 have different positions in the rotating direction between after the cam gears 14 and 15 contact the first contact parts as the cam gears 14 and 15 rotate in the first direction and after the cam gears 14 and 15 contact the second contact parts as the cam gears 14 and 15 rotate in the second direction.

In this embodiment, an orientation (position) in which the arm 23c and 24c contact the contact surface 16e will be referred to as a second orientation (second position), and an orientation (position) in which the arm 23d and 24d contact the contact surface 16e will be referred to as a first orientation (first position). In this embodiment, the rotators 23b and 24b include, but are not limited to, the arms 23c, 24c, 23d, and 24d. For example, the rotator and the arm may be connected to each other via a gear.

Figure 11A:
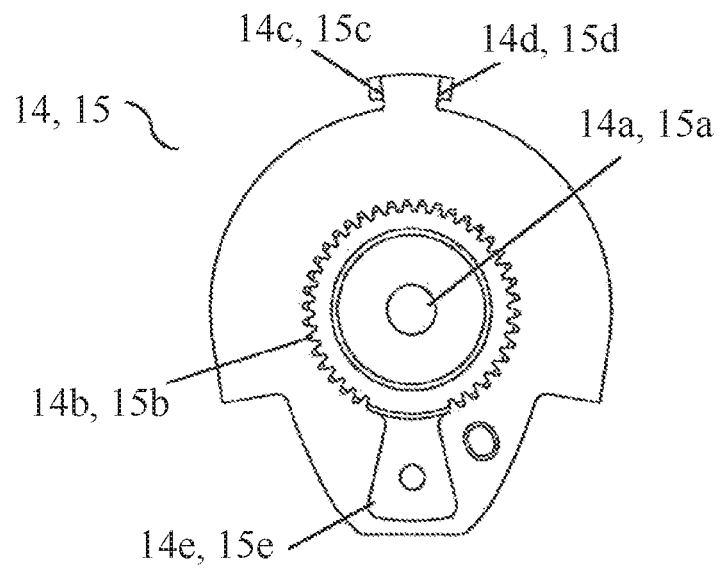
FIGS. 11A and 11B are front and back views of a cam gear viewed from the image sensor side in the focal plane shutter according to each embodiment.
Figure 11B:
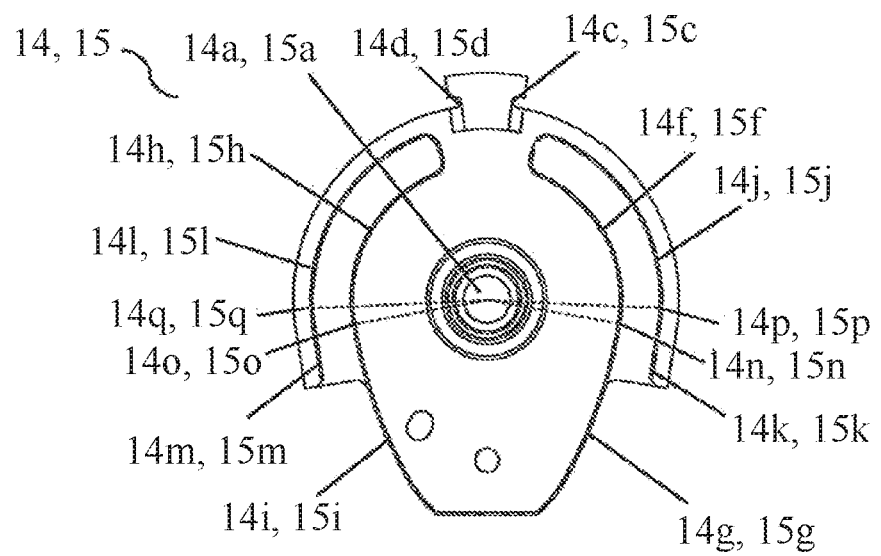
Figure 21:
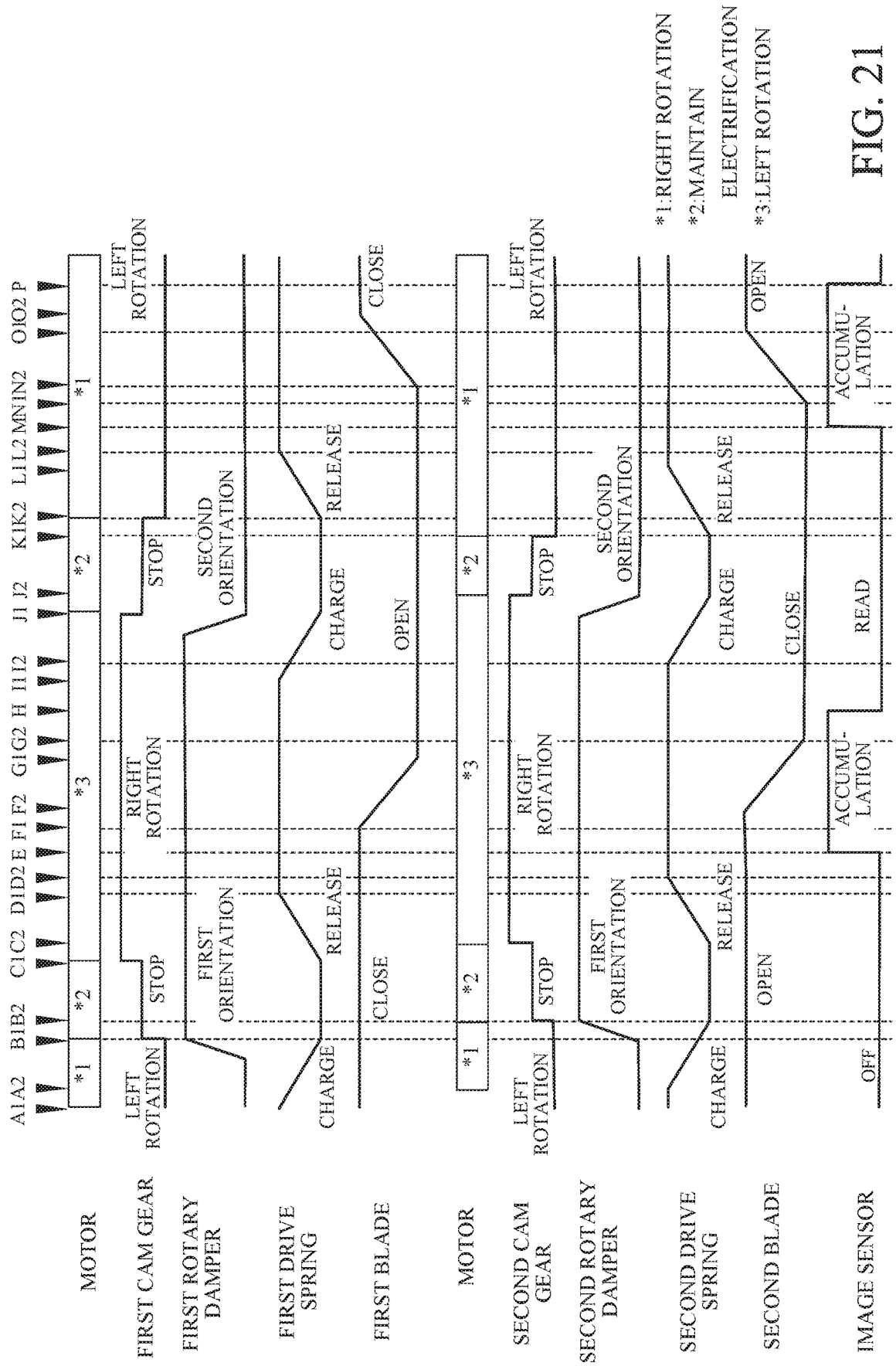
FIG. 21 illustrates an operating timing of each component in the focal plane shutter according to a first embodiment.

Referring now to FIGS. 11A, 11B, and 21, a description will be given of the structures of the cam gears 14 and 15. FIG. 1A is a front view of each of the cam gears 14 and 15 on the image sensor 403 side, and FIG. 11B is its back view. FIG. 21 illustrates an operational timing of each component in the focal plane shutter 113.

The first cam gear 14 is rotatable because the hole 14a is engaged with the shaft 1c on the shutter base 1. The cam gear 14 has notches 14c and 14d. As the cam gear 14 rotates by a predetermined angle in a left rotating direction viewed from the object side, the arm 18a in the drive spring 18 is engaged with the notch 14c and the cam gear 14 receives a force in the right rotating direction viewed from the object side. As the cam gear 14 further rotates by a predetermined angle in the left rotating direction viewed from the object side, the movable end 14e in the cam gear 14 contacts the arm 23c in the rotary damper 23 and rotates in the left rotating direction while receiving the force in a direction opposite to the rotating direction. As the cam gear 14 further rotates by a predetermined angle in the left rotating direction viewed from the object side, the movable end 14e of the cam gear 14 contacts the contact surface 16e on the holder member 16 via the arm 23c in the rotary damper 23, and the rotating phase of the cam gear 14 is determined (second orientation).

On the other hand, as the cam gear 14 rotates by a predetermined angle in a right rotating direction viewed from the object side, the arm 18b in the drive spring 18 is engaged with the notch 14d and the cam gear 14 receives a force in the left rotating direction viewed from the object side. As the cam gear 14 further rotates by a predetermined angle in the right rotating direction viewed from the object side, the movable end 14e in the cam gear 14 contacts the arm 23d in the rotary damper 23 and rotates in the right rotating direction while receiving the force in a direction opposite to the rotating direction. As the cam gear 14 further rotates by a predetermined angle in the right rotating direction viewed from the object side, the movable end 14e of the cam gear 14 contacts the contact surface 16e in the holder member 16 via the arm 23d in the rotary damper 23, and the rotating phase of the cam gear 14 is determined (first orientation).

The cam gear 14 includes a first idle drive cam surface 14f (first area, first rotating area) concentric to the hole 14a, and a first exposure drive cam surface 14g (second area, second rotating area). The first idle drive cam surface 14f holds the first blade unit 2 in an unfolded state via the first cam engagement pin 11b in the first drive member 11. The first exposure drive cam surface 14g changes the first blade unit 2 from the unfolded state to the folded state via the cam engagement pin 11b, and transfers the aperture 1a from the closed state to the open state. The first idle drive cam surface 14f and the first exposure drive cam surface 14g are smoothly connected to a first inflection part 14n. The cam gear 14 further includes a second idle drive cam surface 14h (third area, third rotating area) concentric to the hole 14a, and a second exposure drive cam surface 14i (second area, second rotating area). The second idle drive cam surface 14h holds the first blade unit 2 in a folded state via the second cam engagement pin 11c in the first drive member 11. The second exposure drive cam surface 14i changes the first blade unit 2 from the folded state to the unfolded state via the cam engagement pin 11c, and transfers the aperture 1a from the open state to the closed state. The second idle drive cam surface 14h and the second exposure drive cam surface 14i are smoothly connected to a second inflection part 14o.

Figure 20A:
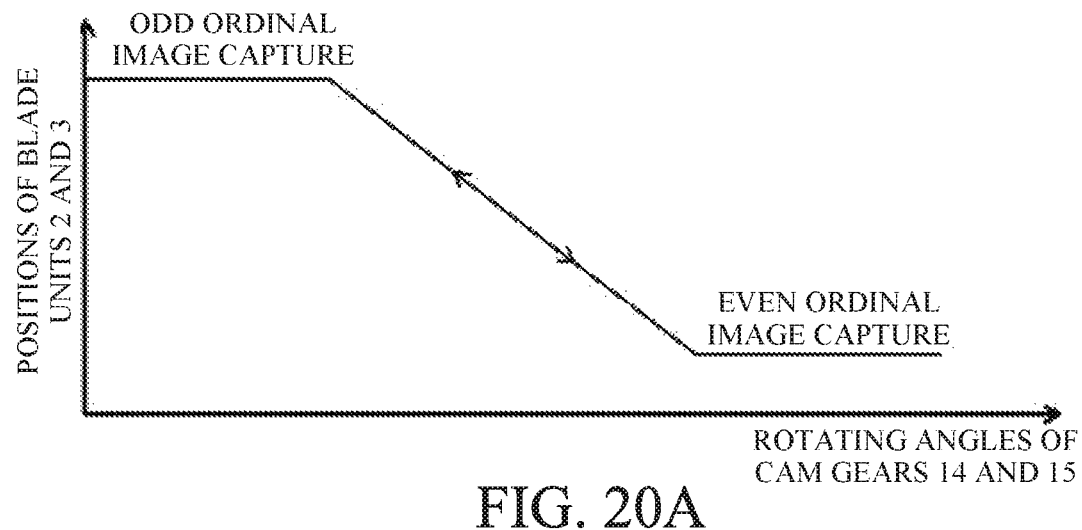
FIGS. 20A and 20B illustrate a relationship between a rotating angle of the cam gear and a blade position and a cam chart of the cam gear in the focal plane shutter according to each embodiment.
Figure 20B:
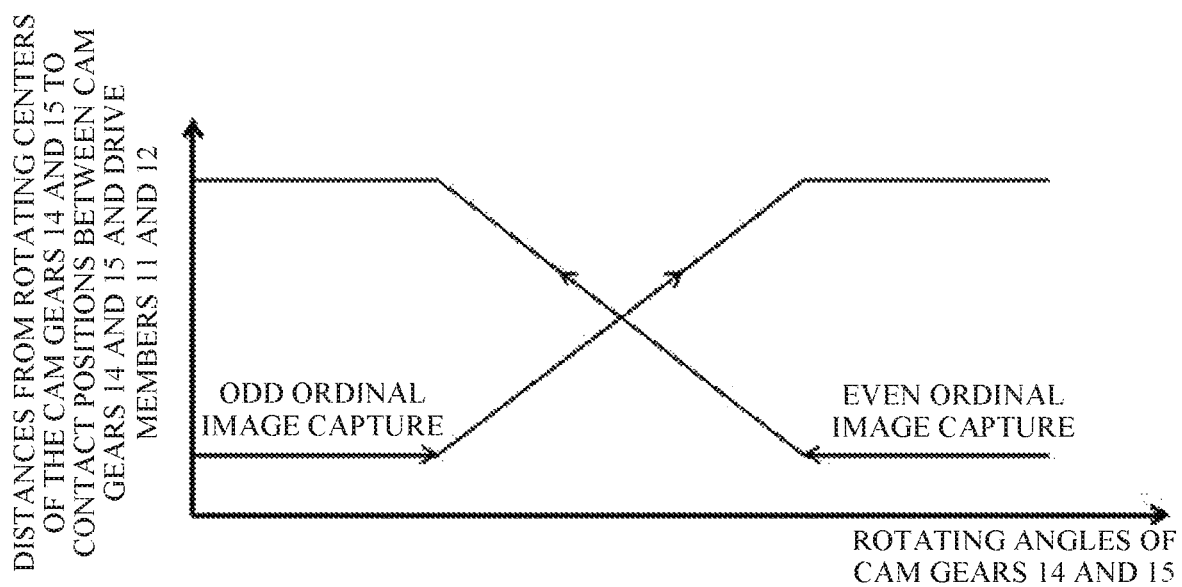

As a radius difference is smaller between the first idle drive cam surface 14f and the second idle drive cam surface 14h, as soon as the first blade unit 2 starts moving, a difference of a driving force which the first driving member 11 receives becomes smaller between the first exposure drive cam surface 14g and the second exposure drive cam surface 14i. In order to make equal the unfolding velocity and the folding velocity of the first blade unit 2 to each other by the driving force of the cam gear 14, the radii may be equal to each other between the first idle drive cam surface 14f and the second idle driving surface 14h. Where the motor driving conditions are equal to each other between the odd ordinal (odd number-th) capture and the even ordinal (even number-th) capture, which will be described later, as illustrated in FIGS. 20A and 20B, in this embodiment, the first driving member 11 traces the first exposure drive cam surface 14g and the second exposure drive cam surface 14i expressed by the same cam chart. Thereby, the first blade unit 2 has the same driving speeds.

The cam gear 14 includes a first holding cam surface 14j formed concentric to the hole 14a, and a first receiving cam surface 14k smoothly connected to the first holding cam surface 14j at a third inflection part 14p. The first idle drive cam surface 14f and the first holding cam surface 14j have predetermined widths, and the first idle drive cam surface 14f, the first exposure drive cam surface 14g, and the first receiving cam surface 14k become wider from the third inflection part 14p to the other end. The cam gear 14 includes a second holding cam surface 14l concentric to the hole 14a, and a second receiving cam surface 14m smoothly connected to the second holding cam surface 14l at a fourth inflection part 14q. The second idle drive cam surface 14h and the second holding cam surface 14l have predetermined widths, and the second idle drive cam surface 14h, the second exposure drive cam surface 14i, and the second receiving cam surface 14m become wider from the fourth inflection part 14q to the other end.

The second cam gear 15 is rotatable because the hole 15a is engaged with the shaft 1g on the shutter base 1. The cam gear 15 has notches 15c and 15d. As the cam gear 15 rotates by a predetermined angle in a left rotating direction viewed from the object side, the arm 18a in the drive spring 18 is engaged with the notch 15c and the cam gear 15 receives a force in the right rotating direction viewed from the object side. As the cam gear 15 further rotates by a predetermined angle in the left rotating direction viewed from the object side, the movable end 15e in the cam gear 15 contacts the arm 24c in the rotary damper 24 and rotates in the left rotating direction while receiving the force in a direction opposite to the rotating direction. As the cam gear 15 further rotates by a predetermined angle in the left rotating direction viewed from the object side, the movable end 15e of the cam gear 15 contacts the contact surface 16e in the holder member 16 via the arm 24c in the rotary damper 24, and the rotating phase of the cam gear 15 is determined (second orientation).

On the other hand, as the cam gear 15 rotates by a predetermined angle in a right rotating direction viewed from the object side, the arm 18b in the drive spring 18 is engaged with the notch 15d and the cam gear 15 receives a force in the left rotating direction viewed from the object side. As the cam gear 15 further rotates by a predetermined angle in the right rotating direction viewed from the object side, the movable end 15e in the cam gear 15 contacts the arm 24d in the rotary damper 24 and rotates in the right rotating direction while receiving the force in a direction opposite to the rotating direction. As the cam gear 15 further rotates by a predetermined angle in the right rotating direction viewed from the object side, the movable end 15e of the cam gear 15 contacts the contact surface 16e in the holder member 16 via the arm 24d in the rotary damper 24, and the rotating phase of the cam gear 15 is determined (first orientation).

The cam gear 15 includes a first idle drive cam surface 15f (first area, first rotating area) concentric to the hole 15a, and a first exposure drive cam surface 15g (second area, second rotating area). The first idle drive cam surface 15f in the cam gear 15 holds the second blade unit 3 in a folded state via the first cam engagement pin 12b in the second drive member 12. The first exposure drive cam surface 15g in the cam gear 15 changes the second blade unit 3 from the folded state to the unfolded state via the cam engagement pin 12b, and transfers the aperture 1a from the open state to the closed state. The first idle drive cam surface 15f and the first exposure drive cam surface 15g are smoothly connected to each other at a first inflection part 15n.

The cam gear 15 further includes a second idle drive cam surface 15h (third area, third rotating area) concentric to the hole 15a and a second exposure drive cam surface 15i (second area, second rotating area). The second idle drive cam surface 15h in the cam gear 15 holds the second blade unit 3 in an unfolded state via the second cam engagement pin 12c in the second drive member 12. The second exposure drive cam surface 15i in the cam gear 15 changes the second blade unit 3 from the unfolded state to the folded state via the cam engagement pin 12c, and transfers the aperture 1a from the closed state to the open state. The second idle drive cam surface 15h and the second exposure drive cam surface 15i are smoothly connected to each other at a second inflection part 15o.

As a radius difference is smaller between the first idle drive cam surface 15f and the second idle drive cam surface 15h, as soon as the second blade unit 3 starts moving, a difference of a driving force which the second driving member 12 receives becomes smaller between the first exposure drive cam surface 15g and the second exposure drive cam surface 15i. In order to make equal the unfolding velocity and the folding velocity of the second blade unit 3 to each other by the driving force of the cam gear 15, the radii may be equal to each other between the first idle drive cam surface 15f and the second idle driving surface 15h. Where the motor driving conditions are equal to each other between the odd ordinal capture and the even ordinal capture, which will be described later, as illustrated in FIGS. 20A and 20B, in this embodiment, the second driving member 12 traces the first exposure drive cam surface 15g and the second exposure drive cam surface 15i expressed by the same cam chart. Thereby, the second blade unit 3 has the equal driving speeds.

The cam gear 15 includes a first holding cam surface 15j concentric to the hole 15a, and a first receiving cam surface 15k smoothly connected to the first holding cam surface 15j at a third inflection part 15p. The first idle drive cam surface 15f and the first holding cam surface 15j have predetermined widths, and the first idle drive cam surface 15f, the first exposure drive cam surface 15g, and the first receiving cam surface 15k become wider from the third inflection part 15p to the other end. The cam gear 15 includes a second holding cam surface 15l formed concentric to the hole 15a, and a second receiving cam surface 15m smoothly connected to the second holding cam surface 15l at a fourth inflection part 15q. The second idle drive cam surface 15h and the second holding cam surface 15l have predetermined widths, and the second idle drive cam surface 15h, the second exposure drive cam surface 15i, and the second receiving cam surface 15m become wider from the fourth inflection part 15q to the other end.

The motor 20 is attached to the holder member 16, as illustrated in FIGS. 7A and 7B. A pinion gear 22 is attached to an output shaft 20a of the motor 20. The pinion gear 22 perforates the hole 16c in the holder member 16, and is engaged with the gear parts 14b and 15b in the cam gears 14 and 15 so as to transmit the torque from the motor 20 to the cam gears 14 and 15. The motor 20 is a stepping motor that switches the electrification state of the coil in accordance with predetermined time intervals and performs the step driving (open loop driving). The motor 20 may perform two types of feedback driving having different fast angle values.

Referring now to FIGS. 12A to 12D and 21, a description will be given of a back-curtain and front-curtain mechanical shutter operation of the focal plane shutter 113 according to this embodiment. FIG. 21 is a timing chart for explaining the operation of the focal plane shutter 113. FIGS. 12A to 12D and 19A to 19D are explanatory views of the states of the focal plane shutter 113 in the steps A to P illustrated in FIG. 21. In each of FIGS. 12A to 12D and 19A to 19D. A and B represent the cam gear 14, the arms 23c and 23d in the rotary damper 23, the first drive member 11, and the first blade unit 2. In each of FIGS. 12A to 12D and 19A to 19D, C and D represent the cam gear 15, the arms 24c and 24d in the rotary damper 24, the second drive member 12, and the second blade unit 3. In each figure, A and C represent a front view viewed from the object side, and B and D represent a back view viewed from the image sensor side. The rotating direction (left and right) is defined as directions of A and C in each figure. In each figure, A and B are counter rotational directions and C and D are counter rotational directions. In the reciprocating exposure, a description will be given of operations of the focal plane shutter 113 in the odd ordinal capture and the even ordinal capture.

<Odd Ordinal Capture (Odd Number-Th Capture)>
(Imaging Standby State)

Figure 12A:
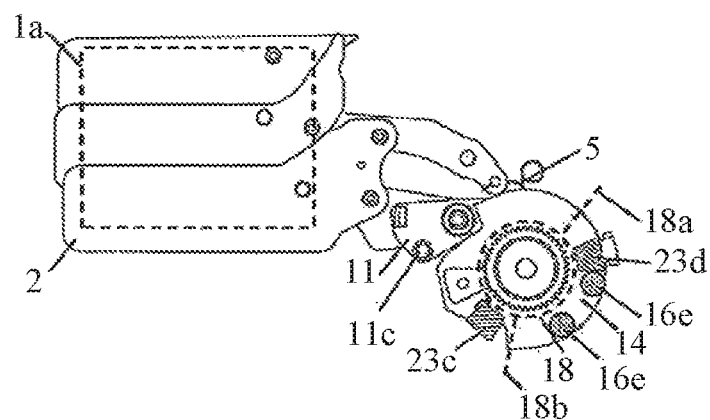
FIGS. 12A and 12D illustrate a standby state of the focal plane shutter before an odd ordinal image capture according to each embodiment.
Figure 12B:
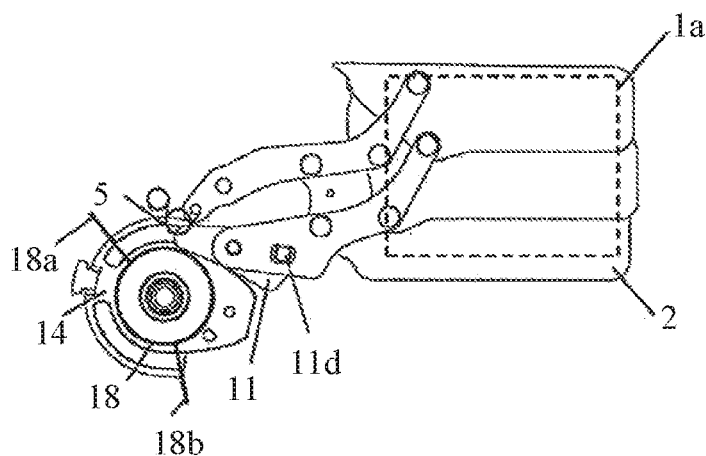

FIGS. 12A to 12D illustrate an odd ordinal standby state before an image is captured with a focal plane shutter according to this embodiment. As illustrated in FIGS. 12A to 12B, the blades 2a. 2b, and 2c close the aperture 1a in the step A1 as the standby state of the imaging apparatus 400. In the step A1, the toggle spring 5 hung in the hole 2i in the blade arm 2e forces the drive pin 11d in the first drive member 11 so that the blade unit 2 closes the aperture 1a. The first cam engagement pin 11b stands by in contact with the first idle drive cam surface 14f in the cam gear 14. At this time, the notch 14c in the cam gear 14 does not contact the arm 18a in the drive spring 18, and the drive spring is not charged and is in a natural state. The rotator 23b in the rotary damper 23 stands by while the arm 23d contacts the contact surface 16e in the holder member 16 (first orientation, first position).

Figure 12C:
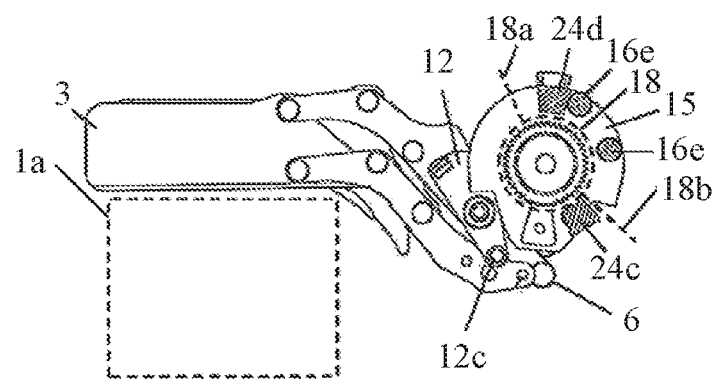
Figure 12D:
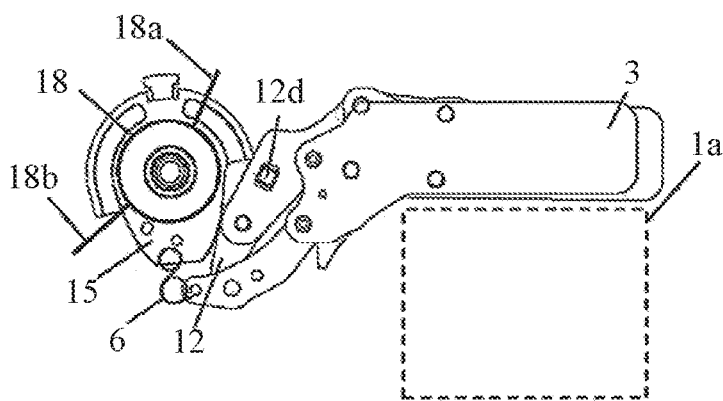

As illustrated in FIGS. 12C and 12D, the blades 3a. 3b, and 3c open the aperture 1a in the step A2 as the standby state of the imaging apparatus 400. In the step A2, the toggle spring 6 hung in the hole 3i in the blade arm 3e forces the drive pin 12d in the second drive member 12 so that the blade unit 3 opens the aperture 1a. The first cam engagement pin 12b stands by in contact with the first idle drive cam surface 15f in the cam gear 15. At this time, the notch 15c in the cam gear 15 does not contact the arm 18a in the drive spring 18, the drive spring 18 is not charged and is in a natural state. The rotator 24b in the rotary damper 24 stands by while the arm 24d contacts the contact surface 16e in the holder member 16 (first orientation, first position).
(Charged State)

When the switch (SW1) 498 turns on in the step A1, the motor 20 is driven in the right rotating direction. Hence, the cam gear 14 rotates in the left rotating direction from the state illustrated in FIGS. 12A and 12B. Since the pinion gear 22 of the motor 20 is engaged with the gear part 14b in the cam gear 14, the motor 20 and the cam gear 14 rotate in counter directions.

As the cam gear 14 rotates in the left rotating direction from the state (step A1) illustrated in FIGS. 12A and 12B, the notch 14c in the cam gear 14 contacts, charges, and rotates the arm 18a in the drive spring 18. The drive circuit 313 starts electrifying the motor 20, and rotates the cam gear 14 by the number of steps equal to or larger than that necessary for the movable end 14e in the cam gear 14 to contact the contact surface 16e on the holder member 16 via the arm 23c in the rotary damper 23. Thereafter, the drive circuit 313 maintains electrifying the motor 20.

Where the rotator 23b in the rotary damper 23 stands by with the first orientation, the movable end 14e in the cam gear 14 contacts the arm 23c in the rotary damper 23 and transfers the rotary damper 23 from the first orientation to the second orientation. At this time, the cam gear 14 receives the force counter to the rotating direction from the rotary damper 23, and the rotating speed decreases. The arm 23c in the rotary damper 23 contacts the contact surface 16e on the holder member 16 and thereby the cam gear 14 stops rotating. At this time, the rotating power of the cam gear 14 is restrained by the rotary damper 23, the repellency on the contact surface reduces, and the cam gear 14 stops quickly.

In the single image capture or in the first frame capture in continuous image captures, the cam gear 14 starts charging from the standby position illustrated in FIGS. 12A and 12B and thus the cam gear 14 has a low rotating speed even when the rotator 23b in the rotary damper 23 stands by with the second orientation. Hence, the repellency on the contact surface reduces even without the damper effect, and the cam gear 14 stops quickly. Therefore, in the single image capture or in the first frame capture in the continuous image captures, the rotator 23b in the rotary damper 23 may stand by with the second orientation while the arm 23c contacts the contact surface 16e on the holder member 16.

Figure 13A:
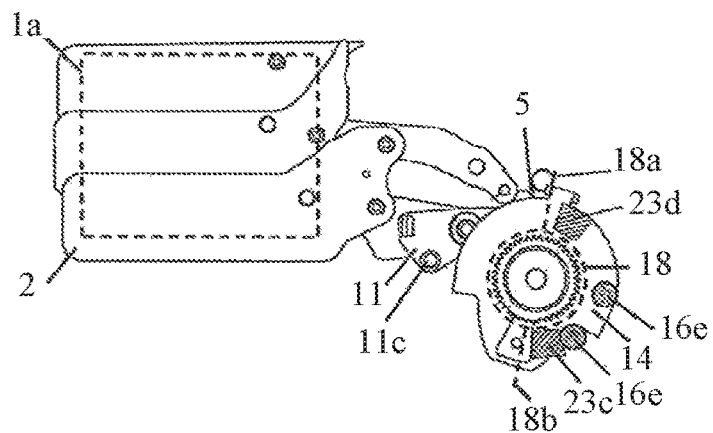
FIGS. 13A to 13D illustrate that a cam gear charges a drive spring in the odd ordinal image capture in the focal plane shutter according to each embodiment.
Figure 13B:
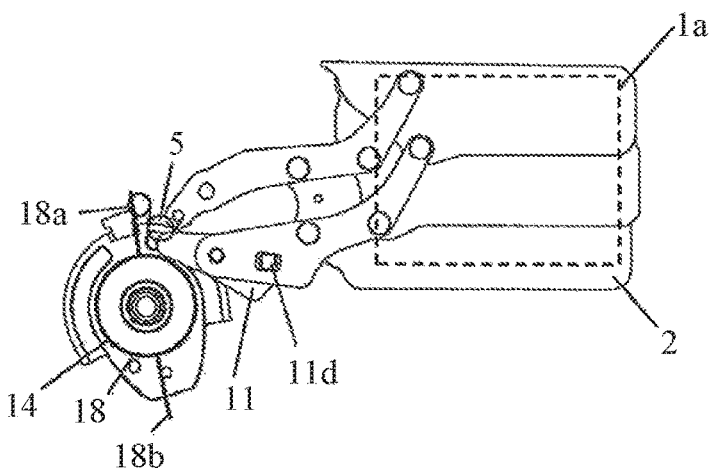

The drive spring 18 is charged in the state (step B1) illustrated in FIGS. 13A and 13B. At this time, the cam gear 14 is forced by the drive spring 18 in the right rotating direction. As illustrated in FIGS. 13A and 13B, the blades 2a, 2b, and 2c close the aperture 1a in the step B1.

The step A1 transfers to the step A2 after the predetermined time passes, and the motor 20 is driven in the right rotating direction. Hence, the cam gear 15 rotates in the left rotating direction from the state illustrated in FIGS. 12C and 12D. Since the pinion gear 22 in the motor 20 is engaged with the gear part 15b in the cam gear 15, the motor 20 and the cam gear 15 rotate in counter directions.

When the cam gear 15 rotates in the left rotating direction from the state (step A2) illustrated in FIGS. 12C and 12D, the notch 15c in the cam gear 15 contacts, charges, and rotates the arm 18a in the drive spring 18. The drive circuit 313 starts electrifying the motor 20, and rotates the cam gear 15 by the number of steps equal to or larger than that necessary for the movable end 15e in the cam gear 15 to contact the contact surface 16e on the holder member 16 via the arm 24c in the rotary damper 24. Thereafter, the drive circuit 313 maintains electrifying the motor 20.

Where the rotator 24b in the rotary damper 24 stands by with the first orientation, the movable end 15e in the cam gear 15 contacts the arm 24c in the rotary damper 24 and transfers the rotary damper 24 from the first orientation to the second orientation. At this time, the cam gear 15 receives the force counter to the rotating direction from the rotary damper 24, and the rotating speed decreases. The arm 24c in the rotary damper 24 contacts the contact surface 16e on the holder member 16 and thereby the cam gear 15 stops rotating. At this time, the rotating power of the cam gear 15 is restrained by the rotary damper 24, the repellency on the contact surface reduces, and the cam gear 15 stops quickly.

In the single image capture or in the first frame capture in the continuous image captures, the cam gear 15 starts charging from the standby position illustrated in FIGS. 12C and 12D and thus the cam gear 15 has a low rotating speed even when the rotator 24b in the rotary damper 24 stands by with the second orientation. Hence, the repellency on the contact surface reduces even without the damper effect, and the cam gear 15 stops quickly. Therefore, in the single image capture or in the first frame capture in the continuous image captures, the rotator 24b in the rotary damper 24 may stand by with the second orientation while the arm 24c contacts the contact surface 16e on the holder member 16.

Figure 13C:
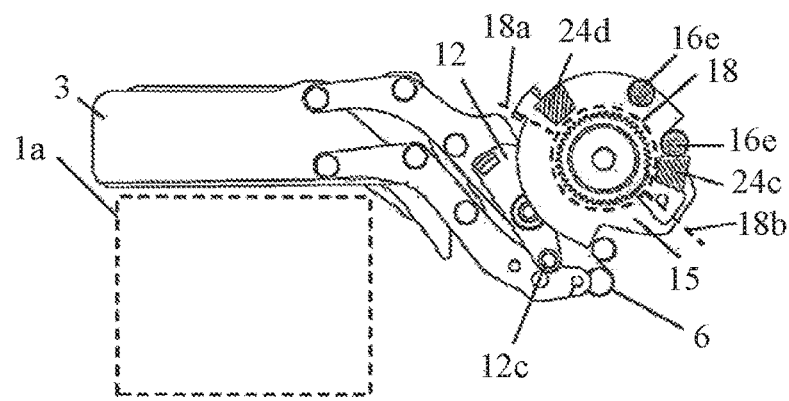
Figure 13D:
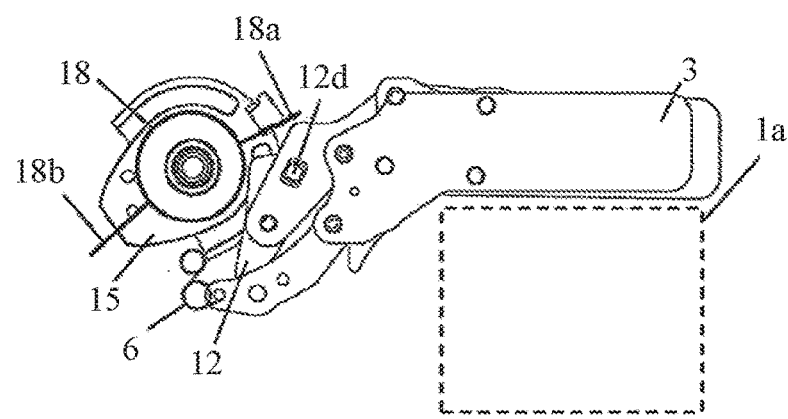

The drive spring 18 is charged in the state (step B2) illustrated in FIGS. 13C and 13D. At this time, the cam gear 15 is forced by the drive spring 18 in the right rotating direction. As illustrated in FIGS. 13C and 13D, the blades 3a, 3b, and 3c open the aperture 1a in the step B2. When the switch (SW1) 498 turns on in the step A1, the imaging apparatus 400 measures a distance to the object through an unillustrated distance measuring unit (focus detector), drives the imaging lens through the lens controller 491 for focusing, and performs another imaging preparation operation.
(Approach Drive)

A predetermined time period (step C1) after the switch (SW2) 499 turns on, the motor 20 is electrified in a direction opposite to the charging direction so as to rotate the cam gear 14 so that the blades 2a, 2b, and 2c open the aperture 1a. When a predetermined time further passes (step C2), the motor 20 is electrified in a direction opposite to the charging direction so as to rotate the cam gear 15 so that the blades 3a. 3b, and 3c close the aperture 1a and to start the approach drive. In the approach drive, a predetermined driving pulse width is gradually reduced so as to gradually increase the rotating speed of the motor 20.

When the electrification to the motor 20 starts, the cam gear 14 is forced by the drive spring 18 and starts rotating in the right rotating direction for the approach. The first drive member 11 is forced by the toggle spring 5 hung in the hole 2i in the blade arm 2e so that the first blade unit 2 closes the aperture 1a. The cam gear 14 starts accelerating while the first cam engagement pin 11b contacts the first idle drive cam surface 14f. At this time, the cam gear 14 is not subject to the rotary damper 23 and can smoothly accelerate. When the electrification to the motor 20 starts, the cam gear 15 is forced by the drive spring 18 and rotates in the right rotating direction for the approach. The second drive member 12 is forced by the toggle spring 6 hung in the hole 3$i$ in the blade arm 3$e$ so that the second blade unit 3 opens the aperture 1$a$. The cam gear 15 starts accelerating while the first cam engagement pin 12$b$ contacts the first idle drive cam surface 15$f$. At this time, the cam gear 15 is not subject to the rotary damper 24 and can smoothly accelerate. The image sensor 403 performs the reset scanning and starts accumulating electric charges for each row a predetermined time (step E) after the switch (SW2) 499 turns on.

(Blade Driving Starts)

The drive circuit 313 drives the cam gears 14 and 15 in the right rotating direction predetermined steps after the steps C1 and C2 (steps F1 and F2). When the cam gear 14 rotates in the right rotating direction from the state (step C1) illustrated in FIGS. 13A and 13B, the first cam engagement pin 11$b$ moves from the first idle drive cam surface 14$f$ as a concentric cam of the cam gear 14 to the first exposure drive cam surface 14$g$ (step F1). The first drive member 11 rotates along the exposure drive cam surface 14$g$, and the second blade unit 2 transfers the aperture 1$a$ from the closed state to the open state.

Figure 14A:
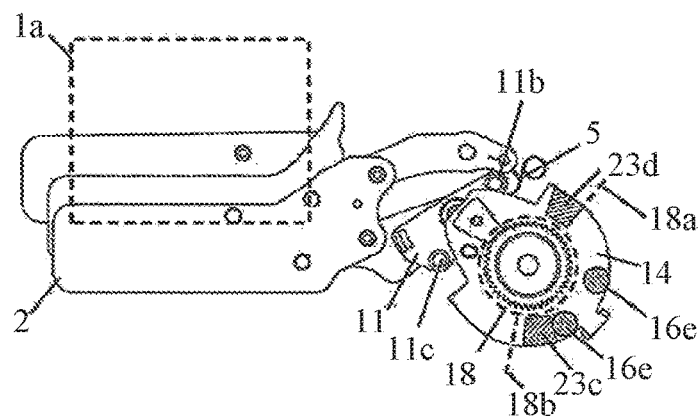
FIGS. 14A to 14D illustrate that the drive member is driven by the cam gear in an exposure operation in the odd ordinal image capture in the focal plane shutter according to each embodiment.
Figure 14B:
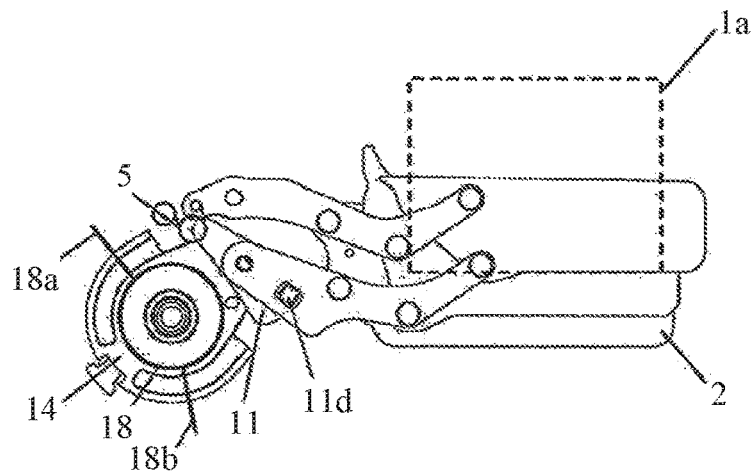

As the cam gear 14 further rotates in the right rotating direction from the state illustrated in FIGS. 14A and 14B, the first cam engagement pin 11$b$ in the first drive member 11 separates from the first exposure drive cam surface 14$g$ on the cam gear 14. Due to the inertial forces of the first drive member 11 and the first blade unit 2 that rotates in association with the first drive member 11, the first drive member 11 rotates so that the first blade unit 2 opens the aperture 1$a$. At this time, the force of the toggle spring 5 has been switched. Therefore, the first drive member 11 is forced by the toggle spring 5 hung in a hole 2$i$ in the blade arm 2$e$ so that the first blade unit 2 opens the aperture 1$a$. The rotating speeds of the first drive member 11 and the first blade unit 2 that rotates in association with the first drive member 11 do not decrease.

As the cam gear 15 rotates in the right rotating direction from the state (step C2) illustrated in FIGS. 13C and 13D, the first cam engagement pin 12$b$ moves from the first idle drive cam surface 15$f$ as a concentric cam of the cam gear 15 to the first exposure drive cam surface 15$g$ (step F2). The second drive member 12 rotates along the exposure drive cam surface 15$g$, and the second blade unit 3 transfers the aperture 1$a$ from the open state to the closed state.

Figure 14C:
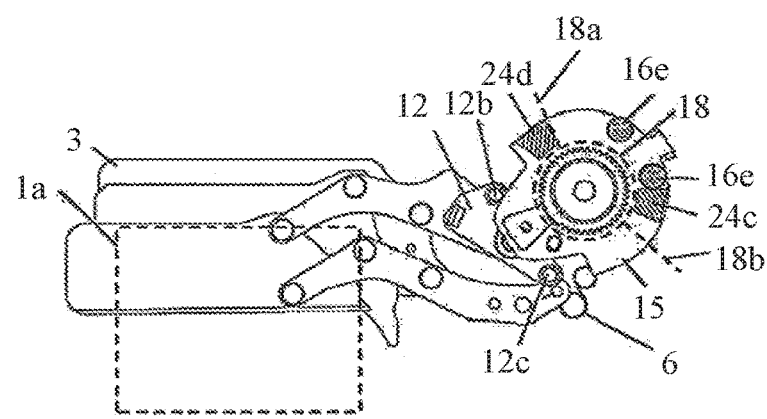
Figure 14D:
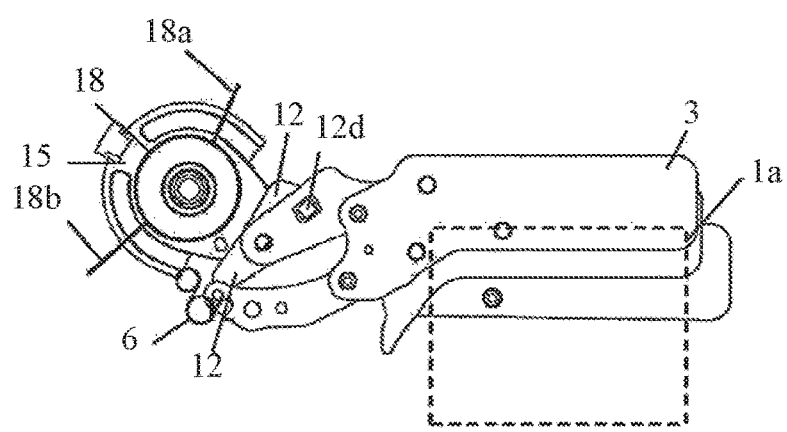

As the cam gear 15 further rotates in the right rotating direction from the state illustrated in FIGS. 14C and 14D, the first cam engagement pin 12$b$ in the second drive member 12 separates from the first exposure drive cam surface 15$g$ in the cam gear 15. Due to the inertial forces of the second drive member 12 and the second blade unit 3 that rotates in association with the second drive member 12, the second drive member 12 rotates so that the second blade unit 3 closes the aperture 1$a$. At this time, the force of the toggle spring 6 has been switched. Therefore, the second drive member 12 is forced by the toggle spring 6 hung in a hole 3$i$ in the blade arm 3$e$ so that the second blade unit 3 closes the aperture 1$a$. The rotating speeds of the second drive member 12 and the second blade unit 3 that rotates in association with the second drive member 12 do not decrease.

Thereby, the blades 2$a$, 2$b$, and 2$c$ that have closed the aperture 1$a$ start opening the aperture 1$a$, the blades 3$a$, 3$b$, and 3$c$ that have opened the aperture 1$a$ start closing the aperture 1$a$. Hence, the first blade unit 2 and the second blade unit 3 expose the image sensor 403 at a shutter speed determined by the photographer.

(Exposure Running Ends)

Figure 15A:
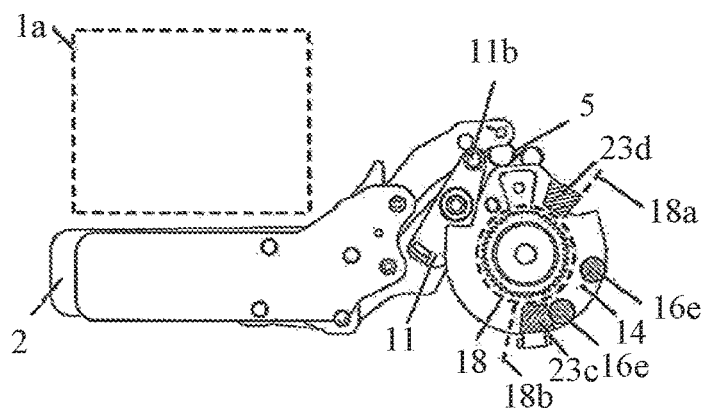
FIGS. 15A to 15D illustrate a blade running completed state in the odd ordinal image capture in the focal plane shutter according to each embodiment.
Figure 15B:
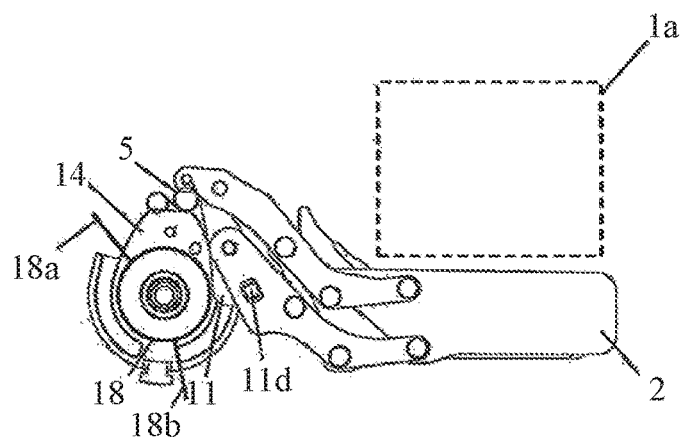

After the cam gear 14 rotates by a predetermined angle from the state illustrated in FIGS. 14A and 14B, the cam gear 14 transfers to the state (step G1) illustrated in FIGS. 15A and 15B. At this time, the second cam engagement pin 11$c$ in the first drive member 11 contacts the second exposure drive cam surface 14$i$ on the cam gear 14 and decelerates along the second exposure drive cam surface 14$i$. Hence, the first drive member 11 and the first blade unit 2 do not receive significant impacts. The second cam engagement pin 11$c$ is guided by the second receiving cam surface 14$m$ on the cam gear 14 and slidably held by the second idle drive cam surface 14$h$ and the second holding cam surface 14$l$, and thus does not cause a semi-open state due to rebounds.

Figure 15C:
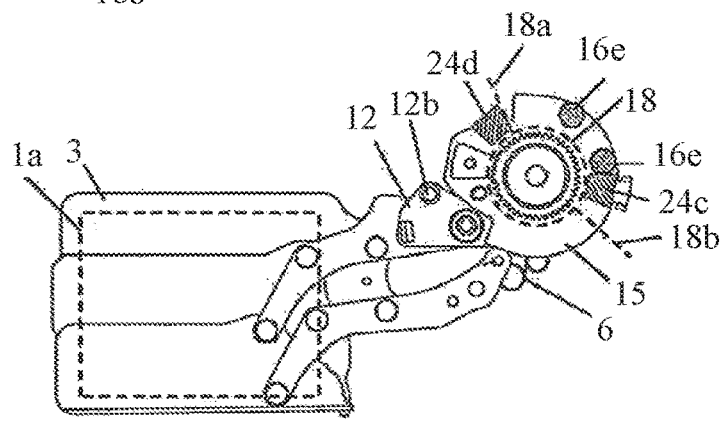
Figure 15D:
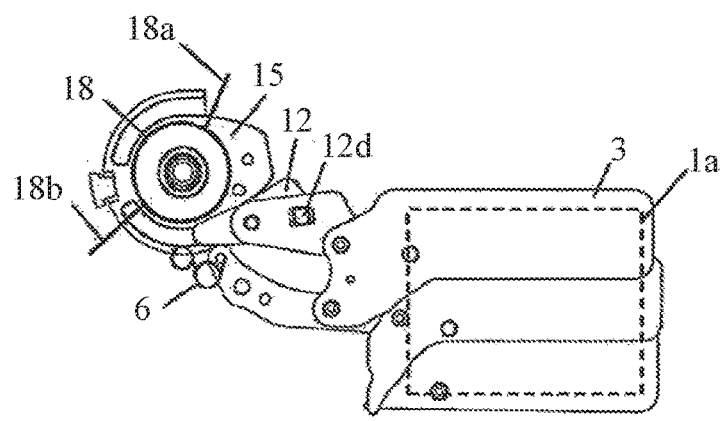

After the cam gear 15 rotates by a predetermined angle from the state illustrated in FIGS. 14C and 14D, the cam gear 15 transfers to the state (step G2) illustrated in FIGS. 15C and 15D. At this time, the second cam engagement pin 12$c$ in the second drive member 12 contacts the second exposure drive cam surface 15$i$ on the cam gear 15 and decelerates along the second exposure drive cam surface 15$i$. Hence, the second drive member 12 and the second blade unit 3 do not receive significant impacts. The second cam engagement pin 12$c$ is guided by the second receiving cam surface 15$m$ in the cam gear 15 and slidably held by the second idle drive cam surface 15$h$ and the second holding cam surface 15$l$, and thus does not cause a semi-open state due to rebounds.

A predetermined time passes after the exposure ends (step H), the imaging apparatus 400 starts still image read scanning of the image sensor 403 since the blade unit 3 shields light from the image sensor 403.

<Even Ordinal Capture (Even Number-Th Capture)>

(Imaging Standby State)

Figure 16A:
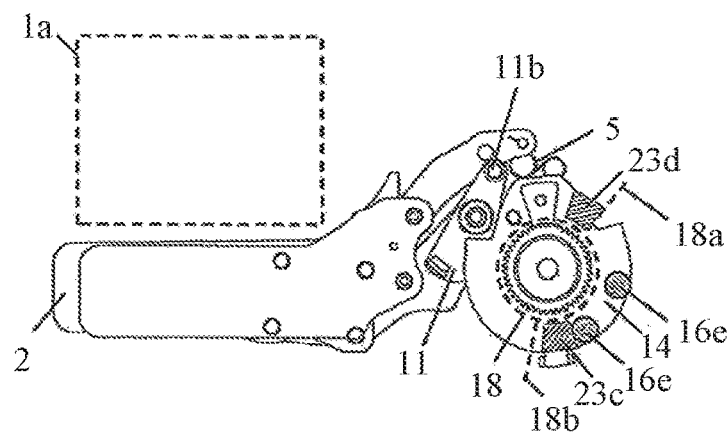
FIGS. 16A and 16D illustrate a standby state of the focal plane shutter before an even ordinal image capture according to each embodiment.
Figure 16B:
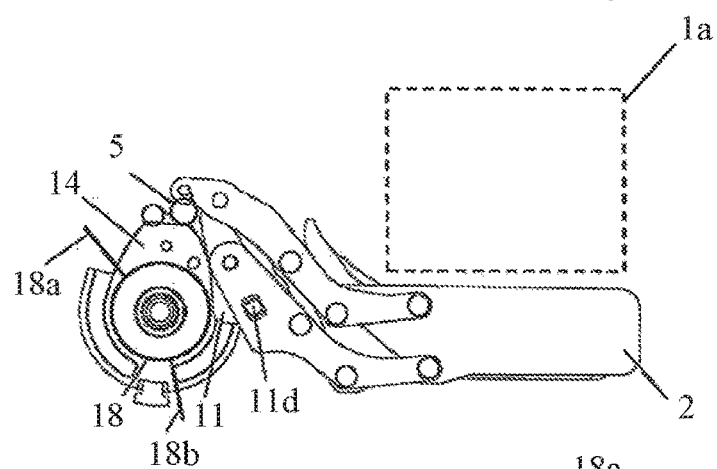

FIGS. 16A to 16D illustrate an even ordinal standby state before an image is captured with the focal plane shutter 113. As illustrated in FIGS. 16A to 16B, the blades 2$a$, 2$b$, and 2$c$ open the aperture 1$a$ in the step I1 as the standby state of the imaging apparatus 400. In the step I1, the toggle spring 5 hung in the hole 2$i$ in the blade arm 2$e$ forces the drive pin 11$d$ in the first drive member 11 so that the blade unit 2 opens the aperture 1$a$. The second cam engagement pin 11$c$ stands by in contact with the second idle drive cam surface 14$h$ in the cam gear 14. At this time, the notch 14$d$ in the cam gear 14 does not contact the arm 18$b$ in the drive spring 18, and the drive spring is not charged and is in a natural state. The rotator 23$b$ in the rotary damper 23 stands by while the arm 23$c$ contacts the contact surface 16$e$ in the holder member 16 (second orientation, second position).

Figure 16C:
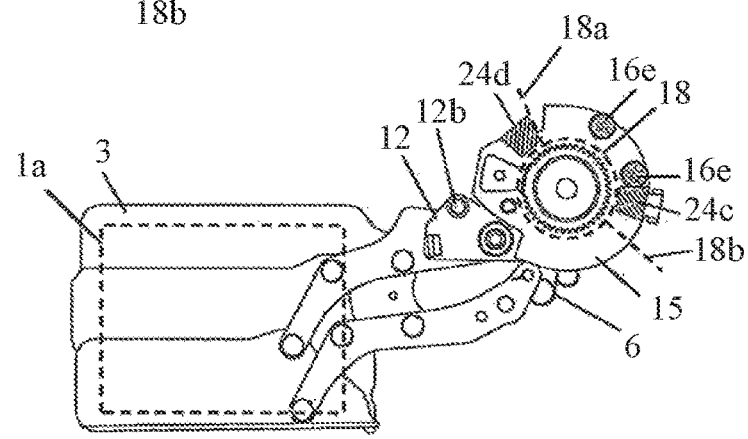
Figure 16D:
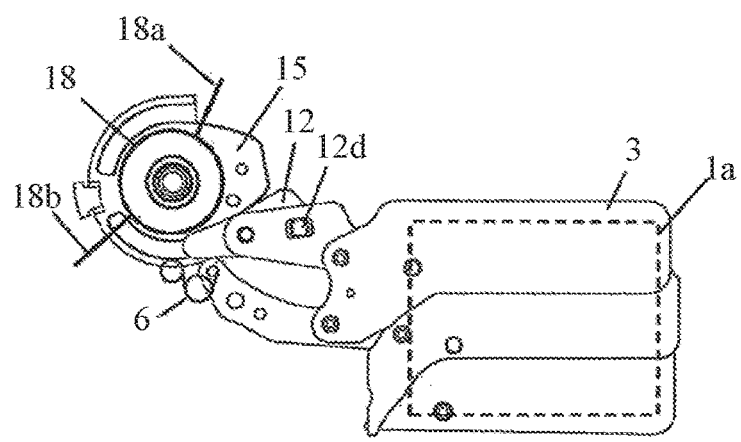

As illustrated in FIGS. 16C and 16D, the blades 3$a$. 3$b$, and 3$c$ close the aperture 1$a$ in the step I2 as the standby state of the imaging apparatus 400. In the step I2, the toggle spring 6 hung in the hole 3$i$ in the blade arm 3$e$ forces the drive pin 12$d$ in the second drive member 12 so that the blade unit 3 closes the aperture 1$a$. The second cam engagement pin 12$c$ stands in contact with the second idle drive cam surface 15$h$ in the cam gear 15. At this time, the notch 15$d$ in the cam gear 15 does not contact the arm 18$b$ in the drive spring 18, and the drive spring 18 is not charged and is in a natural state. The rotator 24$b$ in the rotary damper 24 stands by while the arm 24$c$ contacts the contact surface 16$e$ in the holder member 16 (second orientation, second position).

(Charged State)

When the switch (SW1) 498 turns on in the step I1, the motor 20 is driven in the left rotating direction. Hence, the cam gear 14 rotates in the right rotating direction from the state illustrated in FIGS. 16A and 16B. Since the pinion gear 22 of the motor 20 is engaged with the gear part 14b in the cam gear 14, the motor 20 and the cam gear 14 rotate in counter directions.

As the cam gear 14 rotates in the right rotating direction from the state (step I1) illustrated in FIGS. 16A and 16B, the notch 14d in the cam gear 14 contacts, charges, and rotates the arm 18b of the drive spring 18. The drive circuit 313 starts electrifying the motor 20, and rotates the cam gear 14 by the number of steps equal to or larger than that necessary for the movable end 14e in the cam gear 14 to contact the contact surface 16e on the holder member 16 via the arm 23d in the rotary damper 23. Thereafter, the drive circuit 313 maintains electrifying the motor 20.

Where the rotator 23b in the rotary damper 23 stands by with the second orientation, the movable end 14e in the cam gear 14 contacts the arm 23d in the rotary damper 23 and transfers the rotary damper 23 from the second orientation to the first orientation. At this time, the cam gear 14 receives the force counter to the rotating direction from the rotary damper 23, and the rotating speed decreases. The arm 23d in the rotary damper 23 contacts the contact surface 16e in the holder member 16 and thereby the cam gear 14 stops rotating. At this time, the rotating power of the cam gear 14 is restrained by the rotary damper 23, the repellency on the contact surface reduces, and the cam gear 14 stops quickly.

In the single image capture or in the first frame capture in the continuous image captures, the cam gear 14 starts charging from the standby position illustrated in FIGS. 16A and 16B and thus the cam gear 14 has a low rotating speed even when the rotator 23b in the rotary damper 23 stands by with the first orientation. Hence, the repellency on the contact surface reduces even without the damper effect, and the cam gear 14 stops quickly. Therefore, in the single image capture or in the first frame capture in the continuous image captures, the rotator 23b in the rotary damper 23 may stand by with the first orientation while the arm 23d contacts the contact surface 16e in the holder member 16.

Figure 17A:
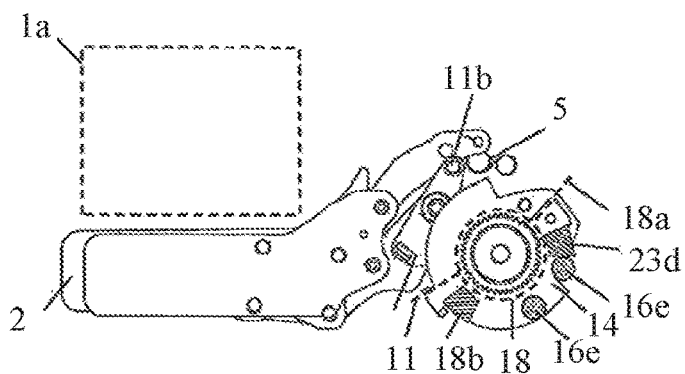
FIGS. 17A to 17D illustrate that a cam gear charges a drive spring in the even ordinal image capture in the focal plane shutter according to each embodiment.
Figure 17B:
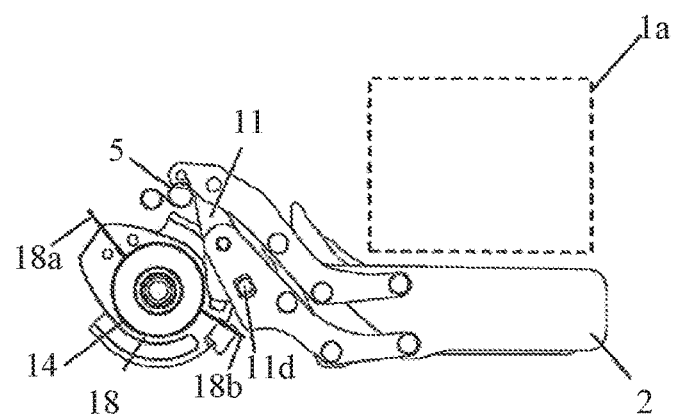

The drive spring 18 is charged in the state (step J1) illustrated in FIGS. 17A and 17B. At this time, the cam gear 14 is forced by the drive spring 18 in the right rotating direction. As illustrated in FIGS. 17A and 17B, the blades 2a, 2b, and 2c open the aperture 1a in the step J1. The step I1 transfers to the step I2 after the predetermined time period passes, and the motor 20 is driven in the left rotating direction. Hence, the cam gear 15 rotates in the right rotating direction from the state illustrated in FIGS. 16C and 16D. Since the pinion gear 22 in the motor 20 is engaged with the gear part 15b in the cam gear 15, the motor 20 and the cam gear 15 rotate in counter directions.

When the cam gear 15 rotates in the right rotating direction from the state (step I2) illustrated in FIGS. 16C and 16D, the notch 15d in the cam gear 15 contacts, charges, and rotates the arm 18b in the drive spring 18. The drive circuit 313 starts electrifying the motor 20, and rotates the cam gear 15 by the number of steps equal to or larger than that necessary for the movable end 15e in the cam gear 15 to contact the contact surface 16e of the holder member 16 via the arm 24d in the rotary damper 24. Thereafter, the drive circuit 313 maintains electrifying the motor 20.

Where the rotator 24b in the rotary damper 24 stands by with the second orientation, the movable end 15e in the cam gear 15 contacts the arm 24d in the rotary damper 24 and transfers the rotary damper 24 from the second orientation to the first orientation. At this time, the cam gear 15 receives the force counter to the rotating direction from the rotary damper 24, and the rotating speed decreases. The arm 24d in the rotary damper 24 contacts the contact surface 16e in the holder member 16 and thereby the cam gear 15 stops rotating. At this time, the rotating power of the cam gear 15 is restrained by the rotary damper 24, the repellency on the contact surface reduces, and the cam gear 15 stops quickly.

In the single image capture or in the first frame capture in the continuous image captures, the cam gear 15 starts charging from the standby position illustrated in FIGS. 16C and 16D and thus the cam gear 15 has a low rotating speed even when the rotator 24b in the rotary damper 24 stands by with the first orientation. Hence, the repellency on the contact surface reduces even without the damper effect, and the cam gear 15 stops quickly. Therefore, in the single image capture or in the first frame capture in the continuous image captures, the rotator 24b in the rotary damper 24 may stand by with the first orientation while the arm 24d contacts the contact surface 16e in the holder member 16.

Figure 17C:
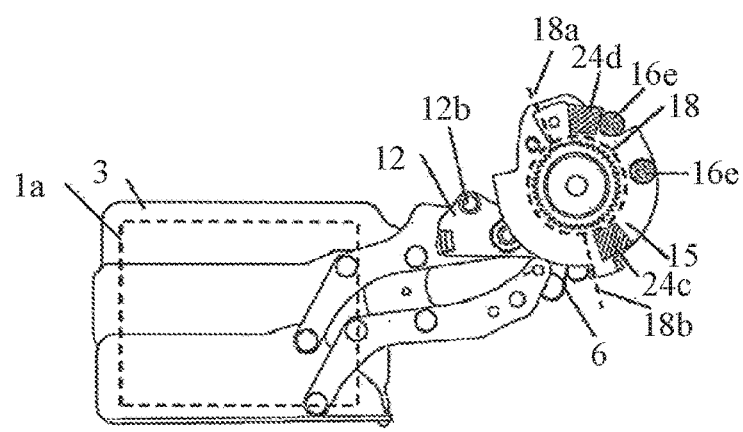
Figure 17D:
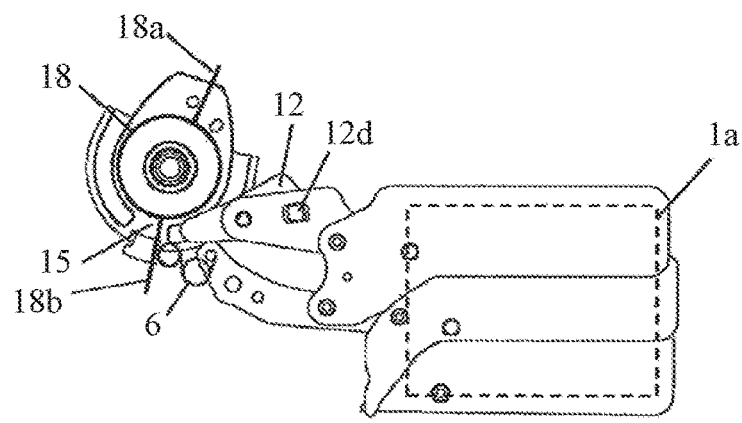

The drive spring 18 is charged in the state (step J2) illustrated in FIGS. 17C and 17D. At this time, the cam gear 15 is forced by the drive spring 18 in the left rotating direction. As illustrated in FIGS. 17C and 17D, the blades 3a, 3b, and 3c close the aperture 1a in the step J2. When the switch (SW1) 498 turns on in the step I1, the imaging apparatus 400 measures a distance to the object through an unillustrated distance measuring unit (focus detector), drives the imaging lens through the lens controller 491 for focusing, and performs another imaging preparation operation.

(Approach Drive)

A predetermined time period (step K1) after the switch (SW2) 499 turns on, the motor 20 is electrified in a direction opposite to the charging direction so as to rotate the cam gear 15 so that the blades 3a, 3b, and 3c open the aperture 1a. When a predetermined time further passes (step K2), the motor 20 is electrified in a direction opposite to the charging direction so as to rotate the cam gear 14 so that the blades 2a, 2b, and 2c close the aperture 1a and to start the approach drive. In the approach drive, a predetermined driving pulse width can be gradually reduced so as to gradually increase the rotating speed of the motor 20.

When the electrification to the motor 20 starts, the cam gear 15 is forced by the drive spring 18 and starts rotating in the left rotating direction for the approach. The second drive member 12 is forced by the toggle spring 6 hung in the hole 3i in the blade arm 3e so that the first blade unit 3 closes the aperture 1a. The cam gear 15 starts accelerating while the second cam engagement pin 12c contacts the second idle drive cam surface 15h. At this time, the cam gear 15 is not subject to the rotary damper 24 and can smoothly accelerate. When the electrification to the motor 20 starts, the cam gear 14 is forced by the drive spring 18 and rotates in the left rotating direction for the approach. The first drive member 11 is forced by the toggle spring 5 hung in the hole 2i in the blade arm 2e so that the first blade unit 2 opens the aperture 1a. The cam gear 14 starts accelerating while the second cam engagement pin 11c contacts the second idle drive cam surface 14h. At this time, the cam gear 14 is not subject to the rotary damper 23 and can smoothly accelerate. The image sensor 403 performs the reset scanning and starts accumulating electric charges for each row a predetermined time (step M) after the switch (SW2) 499 turns on.

(Blade Driving Starts)

The drive circuit 313 drives the cam gears 14 and 15 in the left rotating direction predetermined steps after the steps K1 and K2 (steps N1 and N2). When the cam gear 15 rotates in the left rotating direction from the state (step K1) illustrated in FIGS. 17C and 17D, the second cam engagement pin 12c moves from the second idle drive cam surface 15h as a concentric cam of the cam gear 15 to the second exposure drive cam surface 15i (step N1). The second drive member 12 rotates along the exposure drive cam surface 15i, and the second blade unit 3 transfers the aperture 1a from the closed state to the open state.

Figure 18A:
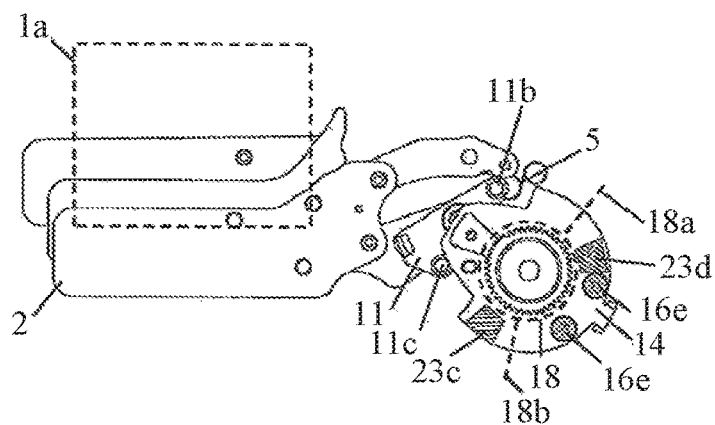
FIGS. 18A to 18D illustrate that the drive member is driven by the cam gear in an exposure operation in the even ordinal image capture in the focal plane shutter according to each embodiment.
Figure 18B:
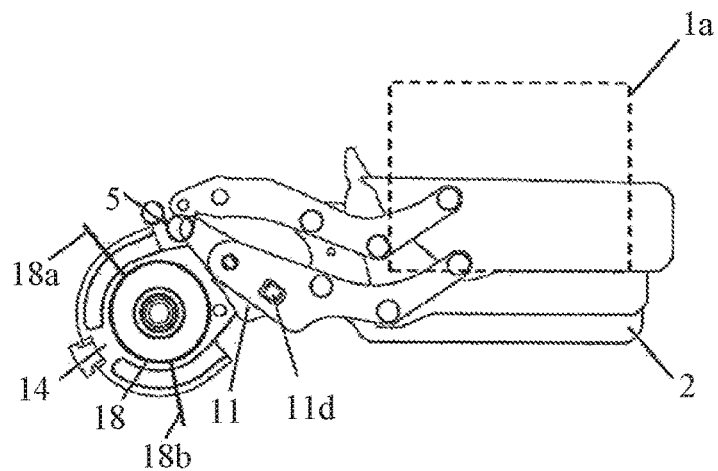
Figure 18C:
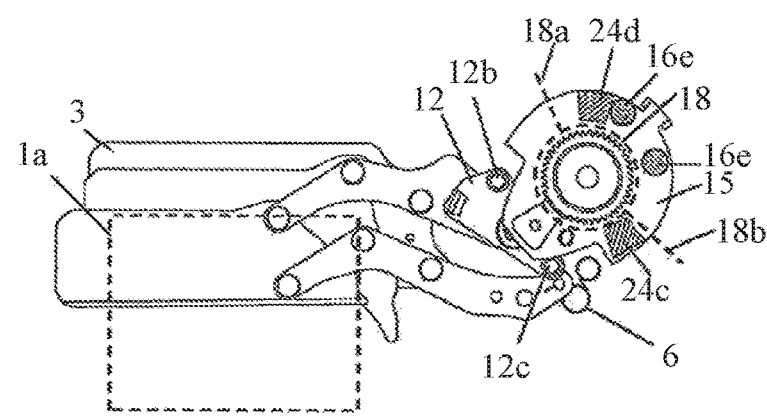
Figure 18D:
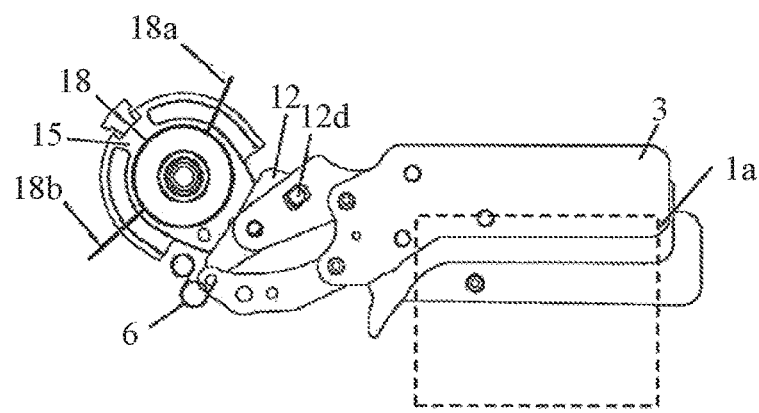

As the cam gear 15 further rotates in the left rotating direction from the state illustrated in FIGS. 18C and 18D, the second cam engagement pin 12c in the drive member 12 separates from the second exposure drive cam surface 15i in the cam gear 15. Due to the inertial forces of the second drive member 12 and the second blade unit 3 that rotates in association with the second drive member 12, the second drive member 12 rotates so that the second blade unit 3 opens the aperture 1a. At this time, the force of the toggle spring 6 has been switched. Therefore, the second drive member 12 is forced by the toggle spring 6 hung in a hole 3i in the blade arm 3e so that the second blade unit 3 opens the aperture 1a. The rotating speeds of the second drive member 12 and the second blade unit 3 that rotates in association with the second drive member 12 do not decrease.

As the cam gear 14 rotates in the left rotating direction from the state (step K2) illustrated in FIGS. 17A and 17B, the second cam engagement pin 11c moves from the second idle drive cam surface 14h as a concentric cam of the cam gear 14 to the second exposure drive cam surface 14i (step N2). The first drive member 11 rotates along the exposure drive cam surface 14i, and the first blade unit 2 transfers the aperture 1a from the open state to the closed state.

As the cam gear 14 further rotates in the left rotating direction from the state illustrated in FIGS. 18A and 18B, the second cam engagement pin 11c in the first drive member 11 separates from the second exposure drive cam surface 14i in the cam gear 14. Due to the inertial forces of the first drive member 11 and the first blade unit 2 that rotates in association with the first drive member 11, the first drive member 11 rotates so that the first blade unit 2 closes the aperture 1a. At this time, the force of the toggle spring 5 has been switched. Therefore, the first drive member 11 is forced by the toggle spring 5 hung in a hole 2i in the blade arm 2e so that the first blade unit 2 closes the aperture 1a. The rotating speeds of the first drive member 11 and the first blade unit 2 that rotates in association with the first drive member 11 do not decrease.

Thereby, as the blades 3a, 3b, and 3c that have closed the aperture 1a start opening the aperture 1a, the blades 2a, 2b, and 2c that have opened the aperture 1a start closing the aperture 1a. Hence, the first blade unit 2 and the second blade unit 3 expose the image sensor 403 at a shutter speed determined by the photographer.
(Exposure Running Ends)

Figure 19A:
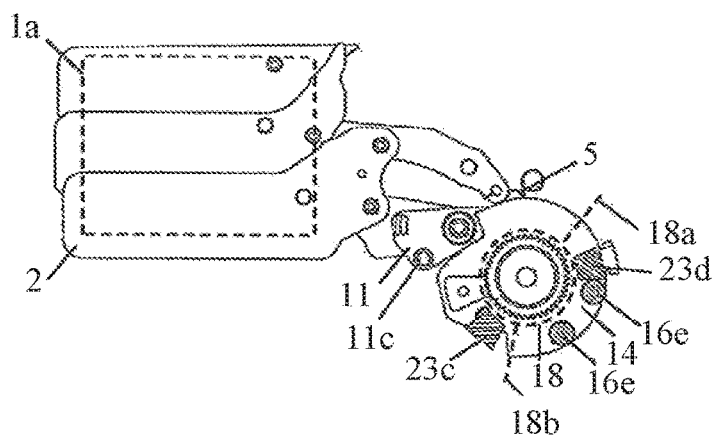
FIGS. 19A to 19D illustrate a blade running completed state in the even ordinal image capture in the focal plane shutter according to each embodiment.
Figure 19B:
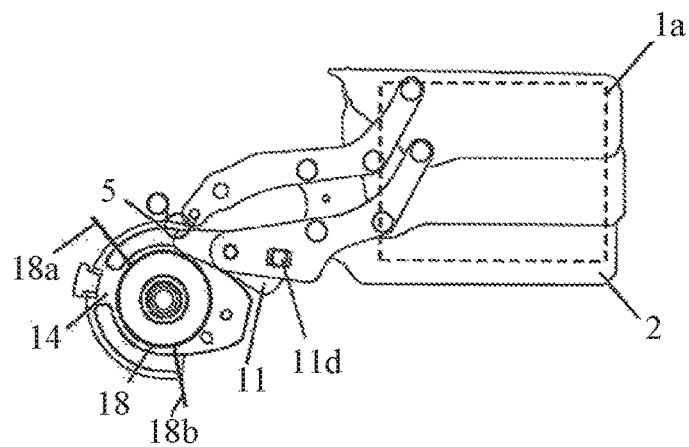
Figure 19C:
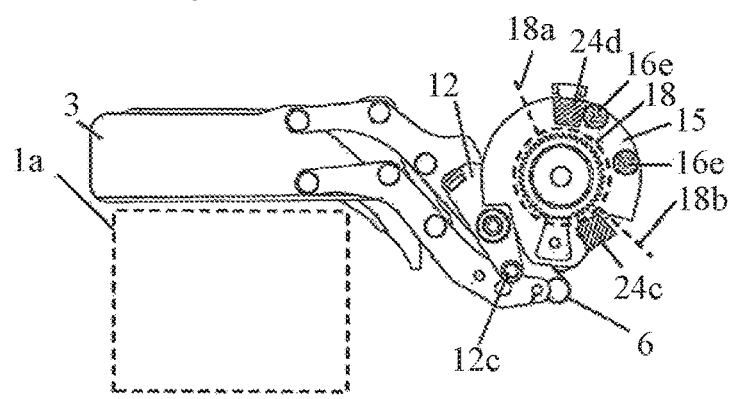
Figure 19D:
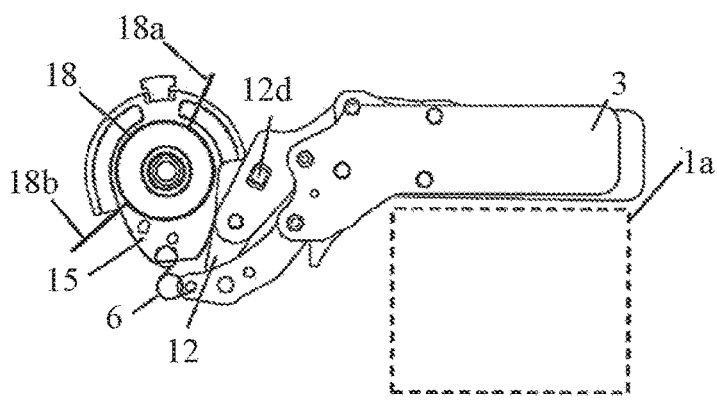

After the cam gear 15 rotates by a predetermined angle from the state illustrated in FIGS. 18C and 18D, the cam gear 15 transfers to the state (step O1) illustrated in FIGS. 19C and 19D. At this time, the first cam engagement pin 12b in the second drive member 12 contacts the first exposure drive cam surface 15f on the cam gear 15 and decelerates along the first exposure drive cam surface 15g. Hence, the second drive member 12 and the second blade unit 3 do not receive significant impacts. The first cam engagement pin 12b is guided by the first receiving cam surface 15k on the cam gear 15 and slidably held by the first idle drive cam surface 15f and the first holding cam surface 15j, and thus does not cause a semi-open state due to rebounds.

After the cam gear 14 rotates by a predetermined angle from the state illustrated in FIGS. 18A and 18B, the cam gear 14 transfers to the state (step O2) illustrated in FIGS. 19A and 19B. At this time, the first cam engagement pin 11b in the first drive member 11 contacts the first exposure drive cam surface 14f in the cam gear 14 and decelerates along the first exposure drive cam surface 14g. Hence, the first drive member 11 and the first blade unit 2 do not receive significant impacts. The first cam engagement pin 11b is guided by the first receiving cam surface 14k in the cam gear 14 and slidably held by the first idle drive cam surface 14f and the first holding cam surface 14j, and thus does not cause a semi-open state due to rebounds.

A predetermined time passes after the exposure ends (step P), the imaging apparatus 400 starts still image read scanning of the image sensor 403 since the blade unit 2 shields light from the image sensor 403.

As described above, in the charging operation, the rotary dampers 23 and 24 reduce the rotating speeds of the cam gears 14 and 15 and the impact in the contact, and the cam gears 14 and 15 can stop quickly. When the cam gears 14 and 15 press the arms 23c (23d) and 24c (24d) in the rotary dampers 23 and 24 against the contact surface 16e in the holder part 16 and thereby move the rotating members 23b and 24b to the positions used for the next captures. Thereby, the rotary dampers 23 and 24 are not influential in the approach drive, and the cam gears 14 and 15 can smoothly accelerate and the damper effect can be obtained only by the charging operation. This embodiment exposes the sensor in the blade reciprocations but may expose the sensor only in one-directional movement.

Second Embodiment

Next follows a description of a second embodiment according to the present invention. The focal plane shutter 113 according to this embodiment is different from that of the first embodiment in that this embodiment uses an electronic front-curtain type shutter apparatus that provides an electronic front shutter operation. Other structures and operations are similar to those of the first embodiment, and a description thereof will be omitted.

Figure 22:
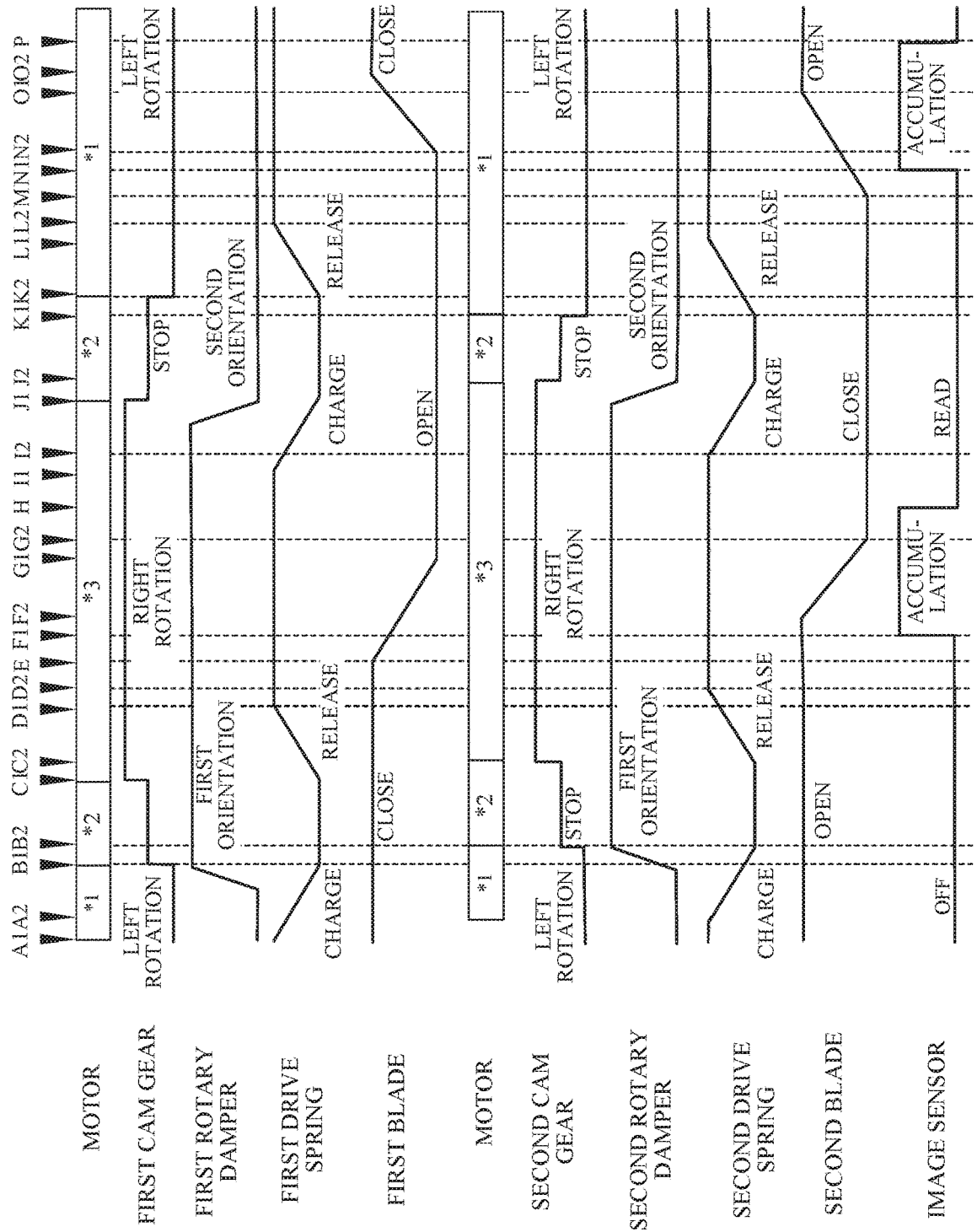
FIG. 22 illustrates an operating timing of each component in the focal plane shutter according to a second embodiment.

FIG. 22 is a timing chart for explaining an operation of the focal plane shutter 113 in the imaging apparatus 400 according to this embodiment. FIGS. 12A to 12D and 19A and 19D illustrate states of the focal plane shutter 113 in the steps A to P illustrated in FIG. 22.

Similar to the first embodiment, according to this embodiment, the odd ordinal capture proceeds in order of the imaging standby state, the charge state, the approach drive, the blade driving start, and the exposure running completion. In the period of the step E after the switch (SW2) 499 turns on when the blade driving starts, all pixel reset state continues in the image sensor 403. When the CPU 409 controls the TG 408 in period of the step E that starts a predetermined time after the switch (SW2) 499 turns on, the TG 408 starts the electronic front-curtain scanning. Herein, the electronic front-curtain scanning is a method for resetting all pixels in the image sensor 403 and then for starting accumulating the electric charges for each line. More specifically, the vertical scanning circuit 421 turns the signal tx_* into a low level in order from the first row to the n-th row. Thereby, the PD 441 for each row is sequentially released from being reset, and enters the accumulation state. Since the scanning pattern used to start accumulating the electric charges for each line is a scanning pattern corresponding to the running characteristics of the blades 3a, 3b, and 3c, any lines in the image sensor 403 can provide a uniform accumulation time (exposure time).

An exposure time is a time period from when the electronic front-curtain scanning starts to when the blades 3a, 3b, and 3c shield light from the image sensor 403. The exposure time is controlled by controlling a predetermined time period from when the motor electrification starts after the switch (SW2) 499 turns on in the step C1. This embodiment starts the electronic front-curtain scanning after the motor 20 is electrified in the step E, but the motor 20 may be electrified after the electronic front-curtain scanning starts depending on the exposure time (when the exposure time is long etc.).

Similar to the first embodiment, according to this embodiment, the even ordinal capture proceeds in order of the imaging standby state, the charge state, the approach drive, the blade driving start, and the exposure running completion. In the period of the step M after the switch (SW2) 499 turns on when the blade driving starts, all pixel reset state continues in the image sensor 403. When the CPU 409 controls the TG 408 in period of the step M that starts a predetermined time after the switch (SW2) 499 turns on, the TG 408 starts the electronic front-curtain scanning. Again, the electronic front-curtain scanning is a method for resetting all pixels in the image sensor 403 and then for starting accumulating the electric charges for each line. More specifically, the vertical scanning circuit 421 turns the signal tx_* into a low level in order from the n-th row to the first row. Thereby, the PD 441 for each row is sequentially released from being reset, and enters the accumulation state. Since the scanning pattern used to start accumulating the electric charges for each line is a scanning pattern corresponding to the running characteristics of the blades 2a, 2b, and 2c, any lines in the image sensor 403 can provide a uniform accumulation time (exposure time).

When the cam gear 14 rotates in the left rotating direction from the state (step K2) illustrated in FIGS. 17A and 17B, the second cam engagement pin 11c mores from the second idle drive cam surface 14h as a concentric cam of the cam gear 14 to the second exposure drive cam surface 14i (step N2). The cam gear 14 rotates the first drive member 11 along the exposure drive cam surface 14i, and the first blade unit 2 transfers the aperture 1a from the open state to the closed state. The exposure time is a time period from when the electronic front-curtain scanning starts to when the blades 2a, 2b, and 2c shield light from the image sensor 403. An exposure time is controlled by controlling a predetermined time period from when the motor electrification starts after the switch (SW2) 499 turns on in the step K1. This embodiment starts the electronic front-curtain scanning after the motor 20 is electrified in the step M, but the motor 20 may be electrified after the electronic front-curtain scanning starts depending on the exposure time (when the exposure time is long etc.).

Each embodiment can provide a shutter apparatus that enables an exposure running in reciprocating directions and stable and fast operations. This configuration can provide a shutter apparatus and an imaging apparatus having a high frame rate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-130541, filed on Jul. 3, 2017 which is hereby incorporated by reference herein in its entirety.

What is claimed is:

1. A shutter apparatus comprising:
    a shutter base having an opening;
    a light shield configured to reciprocate between a closed state that closes the opening and an open state that opens the opening;
    a motor;
    a cam member configured to move the light shield when the cam member is rotated by the motor; and
    a restricting member configured to contact the cam member and to restrict the cam member from rotating in a first direction and in a second direction different from the first direction, the restricting member being rotatable and including a rotary damper engaged with the cam member,
    wherein the restricting member is located at different positions in a rotating direction between when the restricting member restricts the cam member from rotating in the first direction and when the restricting member restricts the cam member from rotating in the second direction.

2. The shutter apparatus according to claim 1, wherein the restricting member includes a first contact part configured to contact the cam member when the restricting member restricts the cam member from rotating in the first direction, and a second contact part configured to contact the cam member when the restricting member restricts the cam member from rotating in the second direction.

3. The shutter apparatus according to claim 2, wherein the restricting member is located at different positions in the rotating direction between after the cam member rotates in the first direction and the restricting member contacts the cam member and after the cam member rotates in the second direction and the restricting member contacts the cam member.

4. The shutter apparatus according to claim 1, wherein the motor is rotatable in a third direction and in a fourth direction, and
    wherein the cam member moves the light shield from the closed state to the open state when the motor rotates in the third direction, and the cam member moves the light shield from the open state to the closed state when the motor rotates in the fourth direction.

5. The shutter apparatus according to claim 4, wherein the cam member includes:
    a first area in which the cam member is movable without moving the light shield;
    a second area that moves the light shield; and
    a third area in which the cam member is movable without moving the light shield.

6. The shutter apparatus according to claim 5, wherein the restricting member changes an orientation as the cam member rotates.

7. The shutter apparatus according to claim 6, wherein the restricting member is engaged with the cam member and changes the orientation in the third area when the motor rotates in the third direction, and the restricting member is engaged with the cam member and changes the orientation in the first area when the motor rotates in the fourth direction.

8. The shutter apparatus according to claim 1, wherein the rotary damper includes a fixed part with which viscous liquid is filled, and a rotator that rotates relative to the fixed part.

9. The shutter apparatus according to claim 8, further comprising a holder member attached to the motor, wherein the rotator in the rotary damper includes a first arm and a second arm, each of which is configured to contact the cam member and thereby to rotate, and wherein the rotary damper restricts the cam member from rotating with a first orientation in which the first arm contacts the holder member, and with a second orientation in which the second arm contacts the holder member.

10. The shutter apparatus according to claim 9, wherein when the rotary damper has the first orientation, the cam member contacts the holder member via the first arm and determines a rotational phase the cam member, and when the rotary damper has the second orientation, the cam member contacts the holder member via the second arm and determines a rotational phase the cam member.

11. The shutter apparatus according to claim 1, wherein the shutter apparatus is an electronic front-curtain type shutter apparatus.

12. An imaging apparatus comprising:
a shutter apparatus; and
an image sensor configured to photoelectrically convert an optical image formed via an imaging optical system, wherein a shutter apparatus includes a shutter base having an opening, a light shield configured to reciprocate between a closed state that closes the opening and an open state that opens the opening, a motor, a cam member configured to move the light shield when the cam member is rotated by the motor, and a restricting member configured to contact the cam member and to restrict the cam member from rotating in a first direction and in a second direction different from the first direction, the restricting member being rotatable and including a rotary damper engaged with the cam member, wherein the restricting member is located at different positions in a rotating direction between when the restricting member restricts the cam member from rotating in the first direction and when the restricting member restricts the cam member from rotating in the second direction.

* * * * *